June 17, 1969 R. J. KALTHOFF ETAL 3,450,261

DATA RETRIEVAL APPARATUS AND METHOD

Filed April 4, 1966 Sheet 1 of 19

INVENTORS
Robert J. Kalthoff
Frederic R. D. Sanborn
Robert D. Perry
BY
Wood, Herron and Evans
ATTORNEYS

DATA RETRIEVAL APPARATUS AND METHOD

Filed April 4, 1966

INVENTORS
Robert J. Kalthoff
Frederic R. D. Sanborn
Robert D. Parry
BY
Wood, Herron and Evans
ATTORNEYS INVENTORS
Robert J. Kalthoff
Frederic R. G. Sanborn
Robert D. Parry
BY
Wood, Herron & Evans
ATTORNEYS

DATA RETRIEVAL APPARATUS AND METHOD

Filed April 4, 1966

INVENTORS
Robert J. Kalthoff
Frederick R. G. Sanborn
Robert D. Parry
BY
Wood, Herron and Evans
ATTORNEYS

DATA RETRIEVAL APPARATUS AND METHOD

INVENTORS
Robert J. Kalthoff
Frederic R. G. Sanborn
Robert D. Parry
BY
Wood, Herron and Evans
ATTORNEYS

DATA RETRIEVAL APPARATUS AND METHOD

Filed April 4, 1966

INVENTORS
Robert J. Kalthoff
Frederic R. G. Sanborn
Robert D. Parry
BY
Wood, Herron and Evans
ATTORNEYS INVENTORS
Robert J. Kalthoff
Frederic R. G. Sanborn
Robert D. Parry
BY
Wood, Herron and Evans
ATTORNEYS

DATA RETRIEVAL APPARATUS AND METHOD

Filed April 4, 1966

INVENTORS
Robert J. Kalthoff
Frederick R. D. Sanborn
Robert D. Parry
BY
Wood, Herron & Evans
ATTORNEYS June 17, 1969 R. J. KALTHOFF ET AL 3,450,261

DATA RETRIEVAL APPARATUS AND METHOD

Filed April 4, 1966

Sheet 9 of 19

INVENTORS
Robert J. Kalthoff
Frederic R. G. Sanborn
Robert D. Parry
BY
Wood, Herron and Evans
ATTORNEYS INVENTORS
Robert J. Kalthoff
Frederic R. G. Sanborn
Robert D. Parry
BY
Wood, Herron & Evans
ATTORNEYS INVENTORS
Robert J. Kalthoff
Frederic R. J. Sanborn
Robert D. Parry
BY
Wood, Herron & Evans
ATTORNEYS June 17, 1969 R. J. KALTHOFF ET AL 3,450,261

DATA RETRIEVAL APPARATUS AND METHOD

Filed April 4, 1966 Sheet 12 of 19

INVENTORS
Robert J. Kalthoff
Frederic R. G. Sanborn
Robert D. Parry
BY
Wood, Herron and Evans
ATTORNEYS

TEN POSSIBLE CODE CONFIGURATIONS OF A TWO-NOTCH, FIVE-BIT FIELD

EQUAL-TO-OR-PLUS-OR-MINUS-WITHIN-A-RANGE LOGIC USING BIT KEYS IN A REAL ESTATE APPLICATION

INVENTORS
Robert J. Kalthoff
Frederic R. F. Sanborn
Robert D. Parry
BY
Wood, Herron & Evans
ATTORNEYS

DATA RETRIEVAL APPARATUS AND METHOD

EQUAL-TO-OR-GREATER-THAN LOGIC USING BIT KEYS IN A REAL ESTATE APPLICATION

CODING COMBINATIONS POSSIBLE WITH BIT KEYS

INVENTORS
Robert J. Kalthoff
Frederic R. G. Sanborn
Robert D. Parry
BY
Wood, Herron & Evans
ATTORNEYS

DATA RETRIEVAL APPARATUS AND METHOD

Filed April 4, 1966 Sheet 15 of 19

INVENTORS
Robert J. Kalthoff
Frederic R. G. Sanborn
Robert D. Parry
BY
Wood, Herron and Evans
ATTORNEYS

DATA RETRIEVAL APPARATUS AND METHOD

INVENTORS
Robert J. Kalthoff
Frederic R. G. Sanborn
Robert D. Parry
BY
Wood, Herron and Evans
ATTORNEYS INVENTORS
Robert J. Kalthoff
Frederic R. G. Sanborn
Robert D. Parry
BY
Wood, Herron and Evans
ATTORNEYS INVENTORS
Robert J. Kalthoff
Frederic R. G. Sanborn
Robert D. Parry
BY
Wood, Herron and Evans
ATTORNEYS INVENTORS
Robert J. Kalthoff
BY Frederic R. S. Sanborn
Robert D. Parry
Wood, Herron and Evans
ATTORNEYS

United States Patent Office 3,450,261

Patented June 17, 1969

3,450,261

DATA RETRIEVAL APPARATUS AND METHOD

Robert J. Kalthoff, Frederic R. G. Sanborn, and Robert D. Parry, Cincinnati, Ohio, assignors to O.K. Partnership, Cincinnati, Ohio, a limited partnership of Ohio Filed Apr. 4, 1966, Ser. No. 539,716
Int. Cl. B07c *5/344;* B42f *21/12*
U.S. Cl. 209—110 55 Claims

ABSTRACT OF THE DISCLOSURE

A data retrieval system for sorting edge notched, randomly stored cards. The cards are provided with two ferromagnetic implants, one adjacent the notched coding edge and the other on the opposite edge. A pivot notch is provided in a transverse edge remote from the ferromagnetic implants. The apparatus includes a horizontal suspension magnet, a horizontal pivot rail and a plurality of selectively shiftable "selector" bars extending parallel to the selector magnet. A pivotally mounted tray is provided for holding a stack of notched cards with their notches uppermost. In a sorting operation, the tray is raised to bring the cards into engagement with the pivot rail and selector magnet so that the cards are suspended at two points. The selector bars are actuated to reject the unwanted cards from the magnet, the cards dropping downwardly with the tray. The selected cards remain suspended on the magnet and pivot rail which are shifted outwardly as a unit to present the selected cards for complete removal.

This invention relates to data retrieval systems of the type utilizing edge notched, randomly stored cards, and is more particularly directed to a novel method and apparatus for selecting either a particular card, or group of cards, from a stack of edge notched cards stored in a tray or other receptacle.

The present method and apparatus for sorting edge notched cards utilize in part the principles of parallel sorting by selective rejection of unwanted cards in the presence of a magnetic field disclosed in Robert J. Kalthoff et al. United States Patent No. 3,199,674 for "Data Retrieval Apparatus and Method." The present method and apparatus, however, constitute substantial improvements over the system disclosed in Patent No. 3,199,674 in several important aspects.

More particularly, one important object of the present invention is to provide a data retrieval system having a substantially higher degree of retrieval sophistication than has heretofore been possible in systems utilizing edge notched cards. There are two aspects to this new order of capability. In the first place, each card in the present system can be coded with a substantially larger amount of information than could heretofore be coded on an edge notched card. Thus, for example, one seven-inch card can be coded in any of ten million million different ways on each edge. The card can readily be coded to indicate the presence of a large number; for example, thirteen or more, of descriptors on which the selection of the card can be based.

A second, and equally important, aspect of the new level of sophistication resides in the greatly increased flexibility with respect to the type, or mode, of search which can be made. Thus, in accordance with this invention, a collection of randomly filed edge notched cards can be sorted in at least six different ways, depending upon the needs of the user at the time of the search.

More particularly, the present system can be utilized in any of the following manners: (1) to locate any single card in a collection by means of its unique descriptor; (2) to locate, through multiple access, any class of cards satisfying any one of a myriad of descriptors; (3) to locate, through multiple cross access, any class of cards which simultaneously satisfy a plurality of descriptors; (4) to loctae a class of cards utilizing an equal to or greater than logic; (5) to locate all cards in a class of cards using an equal to or less than logic; and (6) to locate all cards within a class utilizing an equal to or plus or minus within a range logic.

Another important object of the present invention is to provide a data retrieval system having increased reliability and increased card life.

A fourth object of the invention is to provide a data retrieval system utilizing a novel sorting mechanism which is of simplified construction and which is advantageous because of its compactness and relatively low cost. The end result is a highly sophisticated, inexpensive data retrieval system, the smallest version of which occupies about the same space as an office typewriter.

In order that the significance of these objects can be more fully appreciated, certain aspects of the present method and apparatus will be considered in more detail. Essentially, the present data retrieval system is effective to mechanically retrieve or sort documents, such as rectangular cards. These cards may have printed or written information upon them, such as for example, a reference to a book or periodical, or the personnel data regarding an employee, payment records of a customer, data concerning a house for sale or the like. The card may contain a microxerographic image of a document, or may have one or more apertures each carrying a frame or strip of microfilm. The present system can also be employed with other types of documents, such as microfiches, film jackets, folios or the like. In the following description where reference is made to "cards," it is to be understood that any of these other documents can be coded and retrieved in a similar manner.

In accordance with the present invention, the record cards are coded by notching one edge, termed the "sorting edge," of the card with a plurality of single depth, shallow notches. In one very suitable form of coding, the sorting edge of each card is provided with sixty-five notch sites, although obviously a greater or lesser number can be provided, depending upon the system needs, card size and other factors. In this exemplary system, the sixty-five notch sites are divided into thirteen fields. Each of these fields can be coded with one or more descriptors utilizing either an alpha-numeric or bit code. Thus, a single card can be coded with thirteen or more descriptors.

In the alpha-numeric coding system, the combination of any two of the five notch, or bit, sites are notched to represent a single alphabetical or numerical code. This provides ten different code possibilities in each field. Since there are thirteen fields available, each card can be coded with any one of $10^{13}$ or ten million million possible codes. Alternatively, one or more fields can be coded with one or more bit codes in which any combination of from one to five bits are coded into the field by notching various combinations of from one to five notches.

By way of example, of typical descriptors which may be coded on a card, consider a card representing a house for sale. One of the descriptors coded might relate to the location of the house, the second descriptor to its price, a third descriptor to its age, a fourth descriptor to the availability of transportation, a fifth descriptor to the number of bedrooms, a sixth descriptor to the number of bathrooms, a seventh descriptor to the lot size, an eighth descriptor to the exterior wall construction, e.g. brick, frame or the like. Various other descriptors, such as an identification number for the specific property, could be coded in the remaining fields depending upon the needs of the particular user. In an actual installation, a real estate broker or the like would have a collection of such coded cards relating to all of the property currently on the market. These cards would be stored in random fashion in an open top receptacle or tray.

In accordance with the principles of the present invention, each card also includes in addition to the sorting edge a first ferromagnetic implant mounted along the sorting edge and a second ferromagnetic implant mounted on the opposite edge of the card in a plane generally perpendicular to the sorting edge. The card further is provided with a locator notch formed in the sorting edge for accurately locating the cards in registry with one another, and a pivot notch formed on a transverse edge of the card closely adjacent to the sorting edge.

In a typical installation, a collection of these coded cards; for example, a group of cards relating to all of the real estate on the market in a given city or area, is placed in random order in an open top tray. In order to sort the cards, they are brought into a sorting position in which the cards are suspended in a vertical plane from a magnet. The cards are also restrained, or supported, at a second point, i.e. at the pivot notch which is engaged by a rail member, such as a bar or rod, extending into the notch.

The upper, or main, magnet which supports the cards extends longitudinally along the stack of cards in the tray and engages the upper ferromagnetic implant of each of the cards. The cards are held in alignment by means of a locator member which engages the locator notch in each of the cards.

In accordance with the present method, a second magnet is disposed adjacent to the bottom magnet of the cards. This magnet may be mounted in the tray or in a tray supporting structure. In order to retrieve or select the desired card, or cards, from those not wanted, one or more of the selector bars mounted above the cards is positioned in accordance with the code of the cards to be selected. These selector bars extend across the tray perpendicular to the cards. The selector bars correspond in number to the number of notch sites, with one selector bar being disposed over each notch site when the cards are in the sorting position.

Initially, all of the selector bars are in a retracted, or elevated, position and are disengaged from the stack of cards. The operator, by operating the keys of a console, or control board, causes the selector bars corresponding to the desired code to be advanced relative to the remaining selector bars of the group. For example, if it is desired to select cards having notches in the second, third, eighth, tenth, fourteenth, seventeenth, twenty-third, twenty-eighth, forty-fourth, fifty-second and sixty-third notch sites, the corresponding selector bars are projected from the remaining bars a distance slightly less than the depth of the card notches.

These selector bars are then urged downwardly in unison and are brought into contact with the upper edges of the cards. The selector bars enter the notches of cards having the desired coding and, hence, do not cause these cards to be shifted in any manner. However, any cards which do not have notches in the notch sites corresponding to the selected code are engaged by one or more of the selector bars and are forced from contact with the upper magnet. These rejected cards are shifted a sufficient distance so that they are no longer effectively held by the upper magnet, but rather are positively gripped by the secondary, or lower, magnet. The tray carrying all of the rejected cards then pivots downwardly, effecting a separation of the rejected cards from those that have been selected and which remain in contact with the upper magnet and pivot rail. The magnet and pivot rail can then be shifted outwardly carrying with them the selected cards. Alternatively, the selected cards can be completely disengaged from the rejected cards and pulled from the magnet and pivot rail without shifting the upper magnet and pivot rail.

One of the principal advantages of this present method of sorting by motion in a vertical plane is that the force necessary to effect card separation is substantially reduced. This in turn increases the life of the cards and increases the reliability of the system, since it minimizes the possibility that one or more of the uncut portions of the sorting edges of the cards will be crushed or bent. The increase in reliability of the system is further due to the provision of a second, lower magnet having a field opposing that of the upper magnet. This lower magnet minimizes the possibility that unwanted cards will "hang up" on the upper magnet or be inadvertently "selected." Specifically, the lower magnet firmly grips cards which have been rejected and forced only a slight distance from the upper magnet. Even a minute separation from the upper magnet lessens the attractive force of that magnet on a card. Eventually, the lower magnet predominates and the force of the lower magnet plus the gravitational force acting on the card insure that it is pulled downwardly with the tray.

The use in the present system of cards having single depth shallow notches; for example, notches of the order of 1/16 inch deep, also provides several advantages. In the first place, it increases the card life since there are no long pillars, or tabs, such as might result from multi-depth notching. These pillars, or tabs, are subject to being bent or crushed during the sorting process and, hence, lead to false sorts. The use of single depth notching also contributes to the flexibility of the coding and sorting modes possible with the present system. Furthermore, the use of single depth notches also greatly simplifies the construction of the sorting mechanism since it eliminates the need for means for setting bars at any one of a plurality of depths.

Another aspect of the present invention resides in the provision of novel data cards and novel sorting apparatus for carrying out the present method. More particularly, the novel cards are of generally rectangular form and include a sorting edge adapted to be coded by notching. The sorting edge also is provided with a locating notch for precisely aligning the cards and a ferromagnetic implant. The cards also carry a second ferromagnetic implant on the edge opposite to the sorting edge. The two ferromagnetic implants are disposed substantially perpendicular to the sorting edge. A preferred form of the new card also includes a pivot notch in a third edge adjacent to the sorting edge.

The present sorting apparatus comprises two components, a selector unit and a control console. The selector unit includes a tray for supporting the cards, a slide frame including an upper, or suspension, magnet and pivot rail, and a mechanism for lifting the tray to bring the cards into engagement with the pivot rail and suspension magnet. The selector also includes a plurality of parallel sorting bars, one for each notch site of the cards. These sorting bars are carried by a platen. The selector supports means for setting, or advancing, the various sorting bars in accordance with the desired code. Additionally, the selector includes means for forcing the platen and selector bars downwardly into engagement with the cards to effect a separation between the selected and rejected cards. The rejected cards drop into the tray which has remained in an elevated position. A second, or lower, magnet associated with the tray firmly attracts the cards and carries them downwardly as the tray pivots back to its lowermost or initial position. The selected cards are retained in engagement with the magnet and pivot rail which form part of a slidably mounted frame. This frame can be pulled outwardly for inspection or manual or mechanical removal of the selected cards. The selector unit also includes means for resetting the selector bars at the end of a sorting operation so that the bars can be reset for a subsequent sort.

The second major component of the retrieval system is a console. The console includes a large keyboard some-what similar to a typewriter or adding machine keyboard. The operator enters the code into the selector and initiates the sorting cycle by manipulating the appropriate keys on the console. The details of a preferred form of console and control circuit for the selector are disclosed in the copending patent application of Robert J. Kalthoff, Frederic R. G. Sanborn and Daniel J. Bandenburg for "Console and Control Circuit," Ser. No. 539,792, filed Apr. 4, 1966.

In one preferred embodiment of the present selector, the sixty-five selector bars are grouped into thirteen fields each consisting of five adjacent bars. These bars are set, or positioned, one field at a time by means of a carriage assembly mounted upon the platen. This carriage assembly carries five actuators, each actuator being effective to advance, or set, one selector bar of the field. As the actuator shifts a bar, the bar is releasably locked in its advanced, or downwardly projecting, position. When the actuators carried by the slide assembly have set the bars in a field, the carriage is shifted to the next field. The actuators then set the bars in the second field, following which the carriage and its actuators are shifted to the third field. The selector bars in each of the fields are set in this manner. The carriage can also be selectively shifted past a field without actuating the bars in any field if desired. A single return member, or reset blade, is effective to return all of the blades to their retracted position at the end of a sorting cycle.

One advantage of the present selector bar setting mechanism utilizing a travelling carriage, is that a large number of selector bars, such as sixty-five, can be set utilizing only a small number of electrically controlled elements, such as solenoids. This greatly simplifies the construction of the unit, makes it more compact, minimizes its cost and increases its operating reliability.

One important advantage of the present method and apparatus is that the user can at any time visually observe the number of cards which meet a particular selection criterion. For example, suppose a user is interested in locating articles dealing with the effects of sonic vibration and thermal changes on aluminum sandwich panels. To locate literature references directed to that specific topic, the user would code the descriptors "thermal," "vibration," "panels," "sandwich" and "aluminum." Initially, however, the researcher may feel that some pertinent documents might relate to thermal and sonic vibration effects on sandwich panels formed on metals other than aluminum. Accordingly, he would enter all of the descriptors except "aluminum" and would then cause the selector to proceed through a sorting cycle. The cards corresponding to the coded descriptors "thermal," "vibration," "panels" and "sandwich" would then remain suspended on a magnet and pivot rail while the tray of rejected cards had pivoted downwardly.

If the number of cards selected was relatively small; for example, five or ten, the user might well decide to remove those cards and study all of the pertinent material. If, on the other hand, it was apparent that an unwieldy number of cards had been selected; for example, three hundred, the user could immediately determine the necessity for narrowing the field of his inquiry by performing a new sort with the additional descriptor "aluminum" added. This new search would be made without touching either the selected or the rejected cards by merely programming in the additional field and causing the selector to again proceed through a sort cycle. At the end of this new sort cycle, presumably the number of cards would be vastly reduced since those cards dealing with materials other than aluminum would be eliminated. After the user finishes with the desired cards, they are returned to any random location within the tray.

Thus, one of the unique advantages provided by the present data retrieval system is "browsability." The user can make a rapid trial sort since the sort is made in parallel. The results of this search, in terms of the number of items retrieved, is immediately visable to the user who can then decide whether or not a further winnowing or narrowing of the field of search is desired. If it is, then the additional descriptor, or descriptors, can be programmed into the machine and a new sort made without touching any of the cards.

These and other objects and advantages of the present invention will be more readily apparent from a consideration of the following detailed description of the drawings illustrating a preferred embodiment of the invention.

In the drawings:.

GENERAL DESCRIPTION

Figures 1, 2:
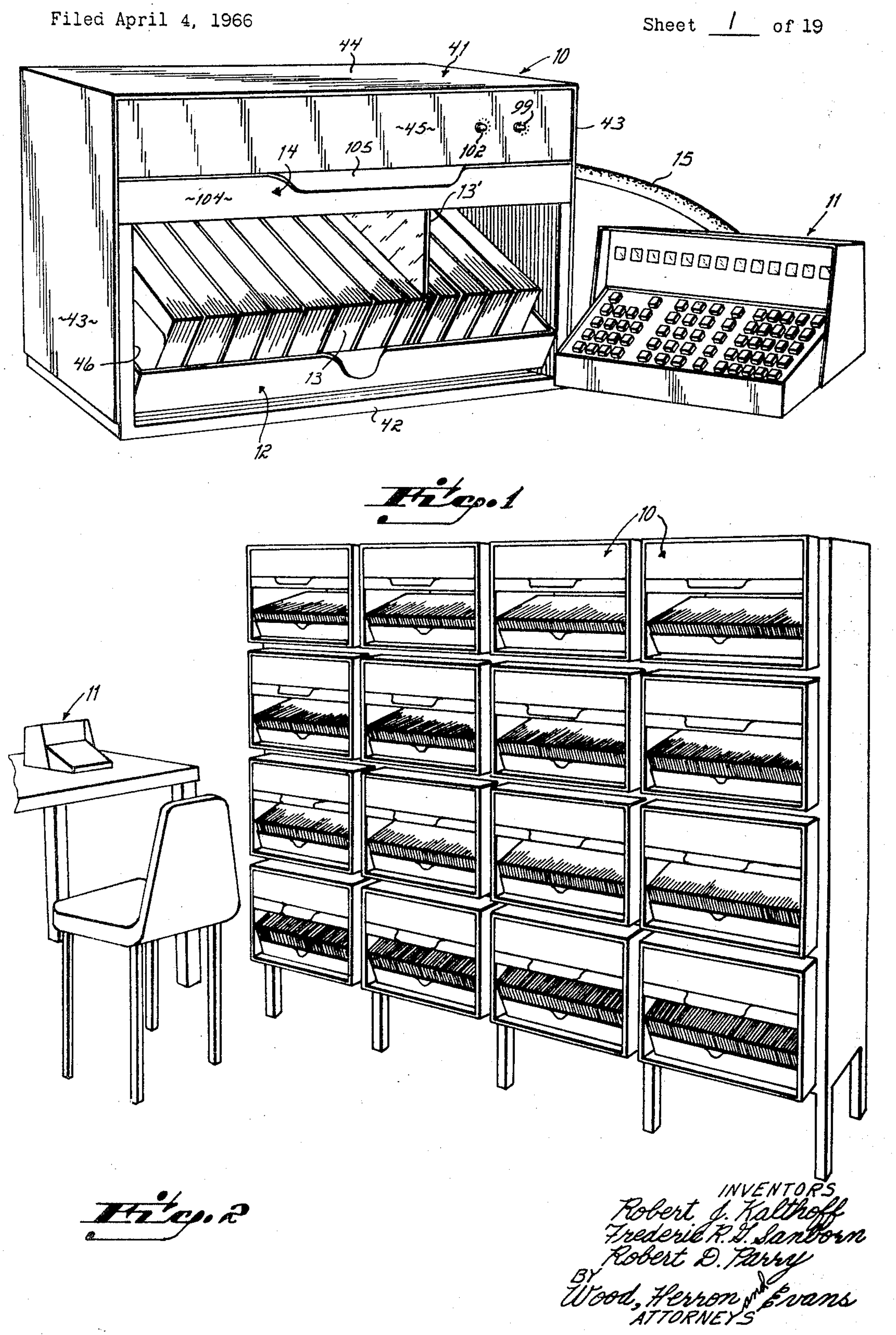
FIGURE 1 is a perspective view of a data retrieval system of the present invention comprising one console and one selector mechanism.
FIGURE 2 is a perspective view of a second data retrieval system of the present invention utilizing a plurality of selectors operated by a single console.

Two preferred forms of data retrieval systems embodying the principles of the present invention are shown in FIGURES 1 and 2. As shown in FIGURE 1, the system comprises two basic units, a selector 10 and a console 11. The selector includes a pivoted tray 12 effective to hold a plurality of record cards 13. The tray 12 is adapted to be pivoted upwardly to bring the cards into cooperative engagement with a selector mechanism, the details of which are described below. The operation of the selector mechanism is controlled from console 11. In essence, the selector mechanism is effective to reject (or to cause to be shifted downwardly) all of the cards 13 except the card, or cards, having a preselected edge notched code. This selected card, or cards, 13' remains suspended upon a slide frame 14. The slide frame can be pulled outwardly from the selector in the manner shown in FIGURE 6 to permit inspection or removal of the selected card. The selected cards can also be removed without shifting the slide frame is desired.

The second component of the system, console 11, is disclosed in detail in the copending patent application of Robert J. Kalthoff, Frederic R. G. Sanborn and Daniel J. Bandenburg for "Console and Control Circuit," Ser. No. 539,792, filed Apr. 4, 1966. Essentially, this console comprises a plurality of keys for introducing selected codes into the selector mechanism and for initiating a sorting cycle of the selector mechanism. The console and selector mechanism are interconnected by a suitable electric cable, such as cable 15.

The data retrieval system shown in FIGURE 2 comprises a plurality of selectors 10 operated by a single console 11. Each of the selectors 10 in the system of FIGURE 2 is identical with the selector 10 of FIGURE 1. Similarly, the console 11 of FIGURE 2 can be identical with the console 11 shown in FIGURE 1. The console is interconnected to each of the selectors through suitable electric cables (not shown). In this system, the console is utilized not only to set up the code within a selector and to control operation of the selector, but is also effective to selectively activate any or all of the selectors during a sorting operation.

RECORD CARDS AND CODING

Figure 3:
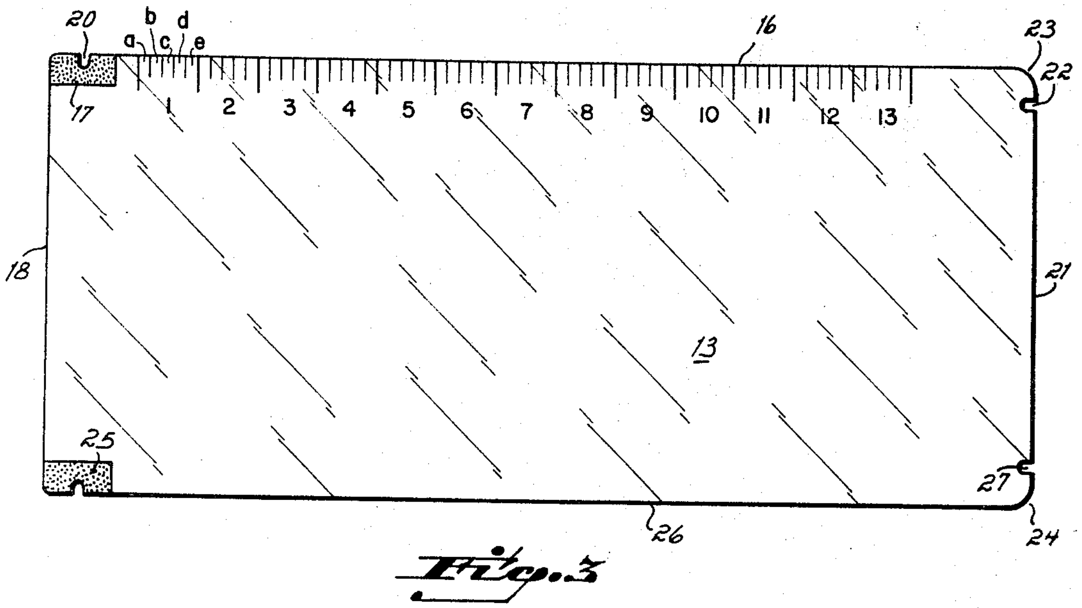
FIGURE 3 is a plan view of one preferred form of record card.
Figure 4:
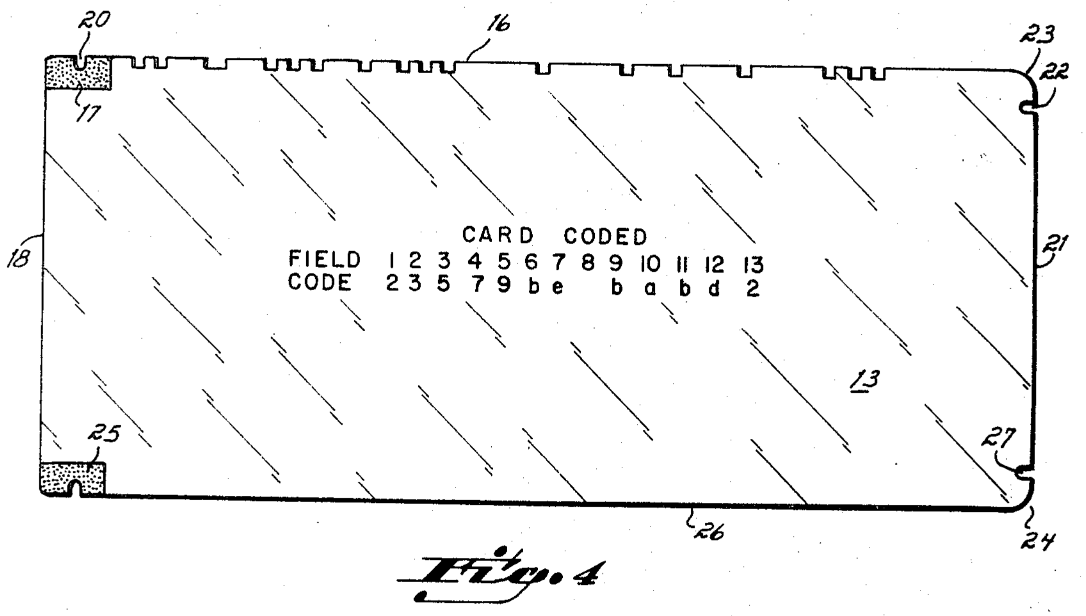
FIGURE 4 is a plan view of the card of FIGURE 3 showing the card with a typical edge notched code.
Figure 26:
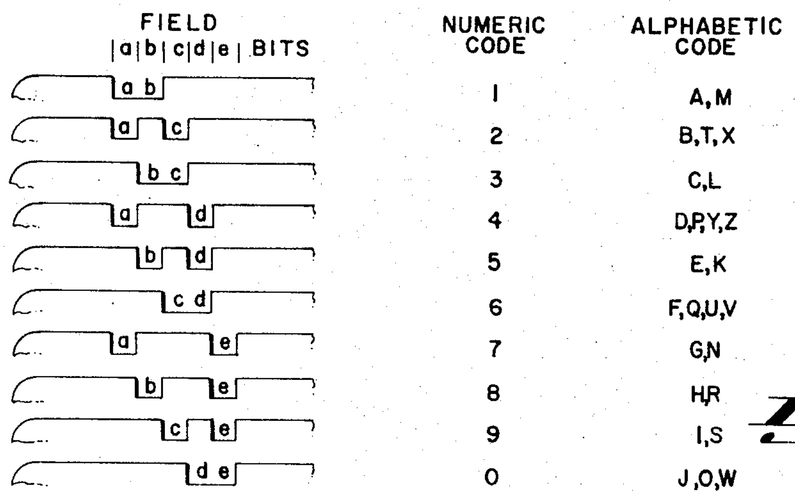
FIGURE 26 is a chart showing one preferred form of a numeric and alphabetic code.
Figure 28:
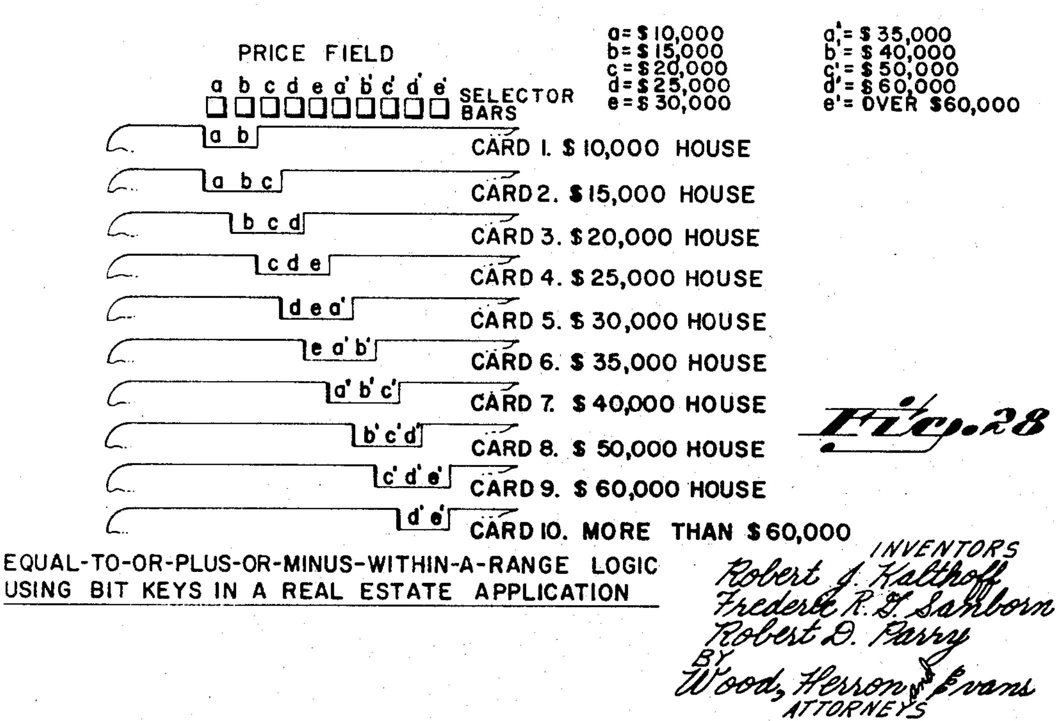
FIGURE 28 is a chart showing the use of bit keys to show an "equal to or plus or minus within a range" logic.
Figure 27:
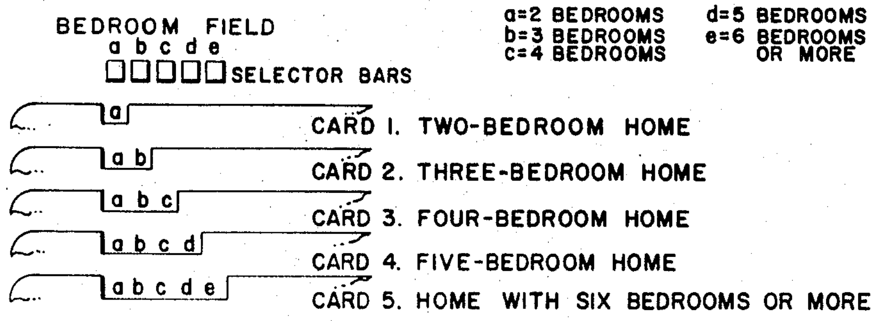
FIGURE 27 is a chart showing the manner in which bit keys can be used in a typical code to establish an "equal to or greater than" logic.

One preferred form of record card 13 is shown in detail in FIGURES 3 and 4. One preferred form of alphabetic and numeric coding for the card is shown in FIGURE 26. Two typical methods of coding the card using only bit notches are shown in FIGURES 27 and 28.

As shown in FIGURES 3 and 4, the card 13 is a generally rectangular card of heavy paper stock, plastic or a laminate. The card may be of any desired size; for example, 7⅜ by 3¼ and may have a thickness of the order of .007 inch. Each of the cards has at least one sorting edge 16 along one of the longitudinal edges of the card. A metal ferromagnetic implant 17 is mounted along the sorting edge adjacent to one corner of the card. The edge 18 adjacent to this implant 17 will be referred to as the "outer edge" of the card. Metal implant 17 is secured to the card in any suitable manner, such as by means of an adhesive, by crimping or by laminating a piece of metal between two or more sheets which together form an integral card.

The sorting edge of the card is also provided with a locator notch 20. This locator notch 20 is preferably formed in the metal implant, but can be spaced from the implant if desired. The inner edge of the card 21, which is opposite the outer edge 18, is also provided with an inwardly extending pivot notch 22. The pivot notch is disposed closely adjacent to the sorting edge 16, but is spaced therefrom by a small amount of the order of ¼ inch. The two inner corners 23 and 24 of the card are rounded with a radius preferably of the order of 1⁄16 inch.

As is shown in FIGURES 3 and 4, a second ferromagnetic member 25 is mounted on the card at the corner formed by outer edge 18 of the card and the second elongated edge 26. This second metal implant 25 may be identical with metal piece 17. Implants 25 and 17 are thus disposed in a plane generally perpendicular to the sorting edge 16. If it is desired to utilize the second elongated edge 26 for coding, a second pivot notch 27 is also formed in the card. Pivot notch 27 is identical with pivot notch 22 and is positioned relative to edge 26 in the same manner as pivot notch 22. In the following description it will be assumed that only sorting edge 16 is coded. It will be understood, however, that the second longitudinal edge 26 can be coded in a similar manner if desired. In order to sort cards in their second edge, the cards obviously must be inverted in tray 12.

Record card 13 includes two opposed surfaces. One or both of these surfaces may contain printed, typewritten, magnetically recorded or written information. The card may also carry a section of microfilm or microxerographic images. Moreover, the present data retrieval system can be utilized effectively with other types of documents; such as by way of example, aperture cards, microfiches, film jackets and the like. In each case, however, the document will have a rectangular configuration generally like that shown in FIGURES 3 and 4. Moreover, the document will be provided with metal implants 17 and 25 and a pivot notch 22 positioned as shown in FIGURES 3 and 4.

Record cards, like record card 13, are coded for use by notching sorting edge 16. In accordance with the present invention, these notches are of substantially uniform depth and are quite shallow. For example, one preferred dimension of a notch is .080 inch wide with the depth of approximately .0625 inch. The card can be notched or coded utilizing a hand punch or, more preferably, by utilizing a coder of the type disclosed in the copending patent application of Robert J. Kalthoff, Frederick R. G. Sanborn and Robert D. Parry for "Coder," Ser. No. 539,708, filed Apr. 4, 1966.

The present selector and retrieval method facilitates the use of many different types of code and search approaches. For example, the coding and search strategies may be alphabetical, numerical, superimposed, equal to or greater than, equal to or less than, plus or minus within a range, multiple access or multiple cross access. In order to enable those skilled in the art to more fully understand the types of coding available, exemplary coding setups will be described in some detail. It is to be understood, however, that the specific codes described are in fact exemplary and a wide variety of other possibilities will undoubtedly suggest themselves to those skilled in the art.

Consider now the card shown in FIGURES 3 and 4 and the coding approach disclosed in FIGURE 26. The sorting edge 16 of card 13 is divided into sixty-five notch sites. The sixty-five notch sites are in turn grouped into thirteen fields designated 1–13. Each field, then, has five notch sites, or bit sites. These are designated with the letters *a, b, c, d, e* in each field. When the card is coded in an alpha-numeric code, two out of the possible five bits are notched in each field. Thus, each field can represent any one of ten characters; e.g. the numbers 1–10.

FIGURE 26 illustrates the manner in which the various bits *a–e* are group in different combinations of two to correspond to the ten digits. Thus, the bits *a* and *b* correspond to the number 1; *a* and *c*, to the number 2; *b* and *c*, to the number 3; *a* and *d*, to 4; *b* and *d*, to 5; *c* and *d*, to 6; *a* and *e*, to 7; *b* and *e*, to 8; *c* and *e*, to 9; and *d* and *e*, to 10. These same combinations of bits can be combined to represent letters of the alphabet as is also shown in FIGURE 26. It will be appreciated that since there are twenty-six letters in the alphabet, two or more of these letters correspond to the same combination of bits. For example, both the letters "A" and "M" correspond to the combination of bits *a* and *b*. This duplication of letters for a combination of bits presents no practical problems so long as reasonable care is taken in setting up the coding system.

Figure 29:
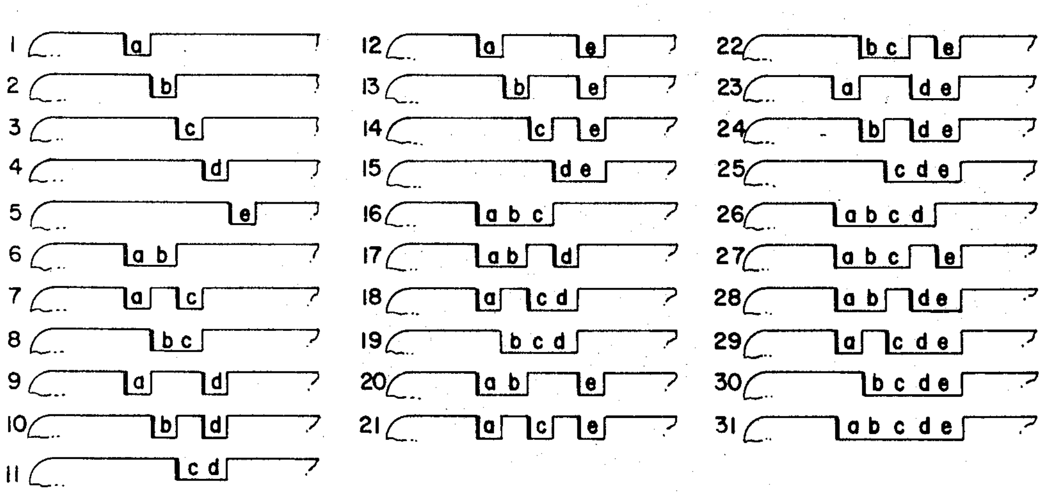
FIGURE 29 is a chart showing the coding combination possible with bit notches.

In addition to the alpha-numeric coding, the bit notches themselves can be employed individually or in various combinations to provide thirty-one "bit" coding combinations per field as shown in FIGURE 29. As is explained in greater detail below, "bit" codes can be superimposed so that more than one bit code can be placed in a single field.

When an alpha-numeric coding system is utilized, there are ten code, or descriptor, possibilities in each of thirteen fields. Thus, in total there are $10^{13}$, or ten million million, possible codes which can be placed on one card edge. The present sorting method and apparatus permits these alpha-numeric descriptors and/or bit codes to be utilized to retrieve information in the many different modes discussed above.

Consider, for example, a collection of cards, each card of which describes an individual in a certain population group, i.e. employees, residents of a locality, etc. Further assume that various fields of the card are coded to provide information regarding whether or not the individual is a male, his age group, whether he is a college graduate, his occupation, and whether or not he is married. This collection of cards can be sorted in accordance with the present method to locate all cards which fit any one of the several descriptors. Thus, all of the "male" cards can be retrieved, all of the cards identifying college graduates, all of the cards showing people in a certain age group, all of the cards relating to people in a certain occupation and all of the cards showing either married or unmarried people, can be retrieved. This is known as "multiple access" and is diagrammatically illustrated below:

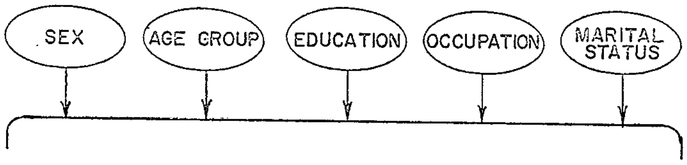

In other words, the same card can be reached for any one of several different selection criteria.

Alternatively, this same collection of cards can be searched, utilizing the present method and apparatus, to locate only those cards which show individuals having each of the selected criteria; for example, male, college graduates who are married, have a certain occupation and are in a certain age group.

Figure 36:
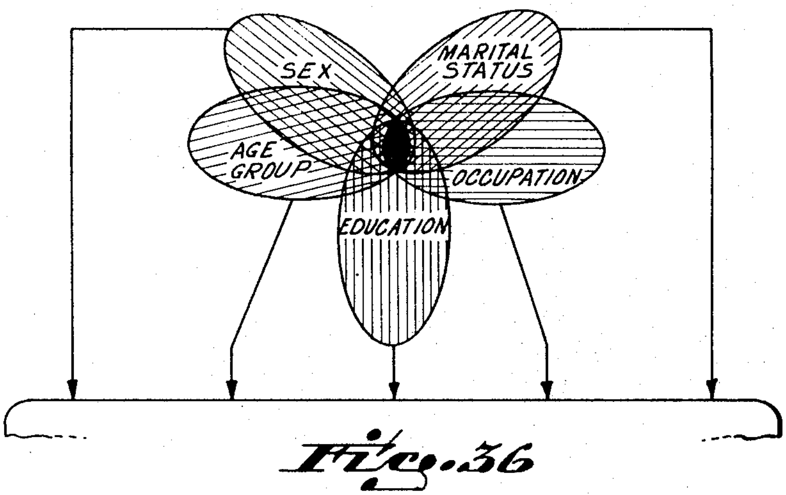
FIGURE 36 is a diagram illustrating "multiple cross access."

This type of search is known as "multiple cross access" and is illustrated diagrammatically by the diagram shown in FIGURE 36.

In this type of search, a card is rejected even if it meets one or more of the criteria so long as it does not meet all of the criteria.

The complete coding of one card is shown in FIGURE 4. This card might be utilized in an employee record system. This system may be set up in accordance with the following chart.

Fields 1–5: Identification No.
Fields 6–8: Occupational description
- 6*a*—Lathe operator
- 6*b*—Typist
- 6*c*—Shorthand
- 6*d*—Bookkeeping
- 6*e*—Computer programmer
- 7*a*—Supervisor
- 7*b*—Filing Clerk
- 7*c*—Switchboard Operator
- 7*d*—Teletype operator
- 7*e*—Receptionist
- 8*a*—Machinist
- 8*b*—Assembly worker
- 8*c*—Quality control technician
- 8*d*—Electrician
- 8*e*—Truck driver Field 9: Personal descriptors
- 9*a*—Male
- 9*b*—Female
- 9*c*—Hourly employee
- 9*d*—Salaried employee
- 9*e*—Union member Field 10: Occupational area
- 10*a*—Office
- 10*b*—Manufacturing
- 10*c*—Sales
- 10*d*—Service
- 10*e*—Technical Field 11: Education
- 11*a*—Education terminated between grades 1–11
- 11*b*—High school graduate
- 11*c*—Some college education
- 11*d*—College degree
- 11*e*—Post graduate study Field 12: Experience
- 12*a*—Trainee
- 12*b*—1 year
- 12*c*—2 years
- 12*d*—5 years
- 12*e*—Longer than 5 years Field 13: Salary
- 1—Under $4,000
- 2—$4,000–$5,999
- 3—$6,000–$7,999
- 4—$8,000–$9,999
- 5—$10,000–$11,999
- 6—$12,000–$13,999
- 7—$14,000–$15,999
- 8—$16,000–$17,999
- 9—$18,000–$25,000
- 0—$25,000 plus The card shown in FIGURE 4 is a card for a female receptionist who also types. This receptionist, who has the identification number 23579, is a high school graduate, has been employed by the company five years and is earning $5,000 a year. Her card is coded as follows: Fields 1–5 respectively are coded with her identification number 23579. Fields 1–5 are numerical fields. Fields 6–12 are bit fields. Field 6 is coded with the bit "*b*" to indicate the employee's typing skill. Field 7 is coded with an "*e*" bit notch to indicate that the employee is a receptionist. The eighth field is not coded since none of the occupational descriptors apply. The ninth field is coded with a "*b*" bit to indicate that the employee is a female. The tenth field is coded in the "*a*" bit site to indicate that she is an office worker. The eleventh field is notched in the "*b*" bit site to indicate that she is a high school graduate. The twelfth field is notched in the "*d*" bit site to indicate that she has been employed five years, and field 13 is notched with a numeral "2" coded to indicate that her salary is in the $4,000–$5,999 range.

It is obvious that this employee's record card may, on occasion, be retrieved as a result of a single access search. For example, the employment office may want her card and may reach it by programming her identification number. On the other hand, the card may be reached as a result of a search in the multiple access mode. For example, suppose that an opening arises for a receptionist for a high executive of the company. Out of all of the employees in the company, the executive is interested in a female receptionist who can type, who is a high school graduate and who has five years experience. To locate the cards of all eligible employees, the selector would be programmed as explained below with a "*b*" in the sixth field for typist, an "*e*" in the seventh field for receptionist, a "*b*" in the ninth field for female, a "*b*" in the eleventh field for high school graduate, and a "*d*" in the twelfth field for five years experience. Only those cards of employees having each of these qualifications will be retrieved as a result of a multiple cross access search.

The use of the bit notches in one or more fields also provides for searches to be made on an "equal to or greater than" logic, an "equal to or less than" logic, or an "equal to or plus or minus within a range" logic. FIGURE 27 illustrates an example of coding by means of which cards can be searched using an "equal to or greater than" logic. As there shown, the five bit keys are used in a field of the card assigned to indicate the numbers of bedrooms in a house. The desideratum in this application is to retrieve all cards showing houses having at least as many bedrooms as a particular buyer may desire.

As shown in FIGURE 27, the field is notched at bit "*a*" to indicate a two-bedroom home, bit "*b*" represents a three-bedroom home, but "*c*" represents a four-bedroom home, bit "*d*" represents a five-bedroom home and bit "*e*" represents a home having more than five bedrooms. If the cards were to be coded on an "equal to" logic, each card would be notched at one site in accordance with the number of bedrooms in the corresponding house. Thus, card 1 representing a two-bedroom house would be notched in site "*a*," card 3 representing a four-bedroom house would be notched only in site "*c*" and so forth.

In the system actually illustrated in FIGURE 27, however, it is assumed that a buyer who must have at least three bedrooms would be interested in knowing of the availability of houses having more than three bedrooms; provided, of course, that the houses with more than three bedrooms had all of the other features which the particular buyer required. To achieve this, the cards must be retrieved using an "equal to or greater than" logic. In accordance with the present invention, this is accomplished by coding each card with multiple bits. One bit corresponds to the actual number of bedrooms in a house and the other bits correspond to each of the lesser numbers of bedrooms being coded.

Specifically, as shown in FIGURE 27, card 2 representing a three-bedroom house is notched at site "*b*" representing that the house has three bedrooms. It is also notched at site "*a*" because "*a*" represents two bedrooms and the house in question has more than two bedrooms. If these cards are being retrieved and the selector is programmed for a two-bedroom house, i.e. for retrieval of cards notched in site "*a*," both card 1 and card 2 would be retrieved since they are both notched in this site. If, however, the selector were programmed for a three-bedroom house, i.e. for retrieval with a card notched both in the "*a*" and "*b*" sites, only card 2 would be retrieved. Card 1, the two-bedroom house card, would be rejected since it is not notched in site "*b*."

The same coding system and search logic can be employed to search on an "equal to or less than" basis. For example, card 1 might represent a house five years old, card 2 might represent a house ten years old, card 3 might represent a house fifteen years old, card 4 might represent a house twenty years old and card 5 might represent a house more than twenty years old. In each instance, when the selector is programmed to search for a house of a given age, e.g. ten years old, it will also automatically retrieve houses of a lesser age, i.e. houses ten years old and five years old.

A third type of retrieval operation which can be conducted utilizing the present cards, retrieval equipment and method is a search which will retrieve all cards which are coded in a given field either with an amount equal to a selected figure or an amount less than or greater than the figure selected within a predetermined range.

One example of a search of this type is illustrated in FIGURE 28. This figure also illustrates cards coded in a real estate operation. In the embodiment there shown, however, the bit keys constitute a ten bit field including the bit keys *a, b, c, d, e, a′, b′, c′, d′*, and *e′*. In this code system, bits *a, b, c, d* and *e* represent the values of $10,000, $15,000, $20,000, $25,000 and $30,000 respectively. Since a greater range in values is to be coded, five additional bits are utilized in the field so that *a′, b′, c′, d′* and *e′* are used to represent values of $35,000, $40,000, $50,000, $60,000 and more than $60,000 respectively.

The cards are coded in such a manner that the bit representing the actual asking price is coded and at the same time the bits representing the next lower and next higher price ranges are also coded. The theory of this is that a person willing to spend $20,000 on a house might be willing to spend $25,000 in order to obtain exactly the features he wants. Similarly, such a buyer would be delighted to pay only $15,000 for the features he was willing to pay $20,000 for. Moreover, the asking price of houses are sometimes unrealistically high or the buyer's estimate of the price he wants to pay is unrealistically low. These factors are automatically compensated for in the coding scheme set forth and the search method employed.

To illustrate, card 4 is coded to represent a house, the asking price of which is $25,000. In an "equal to" coding scheme this card would be coded only in notch site "*d*." However, in accordance with the present method, the card is also coded in notch site "*c*" corresponding to a $20,000 house and in notch site "*e*" corresponding to a $30,000 house. The card representing this house would then be retrieved in three cases. In the first place, when retrieving cards for buyers looking for a $25,000 house, notch site "*d*" would be searched. This would bring forth card 4. Similarly, when retrieving cards for buyers looking for a $20,000 house, notch site "*c*" would be searched. This again, would result in the retrieval of card 4. Finally, a buyer looking for a $30,000 house would cause notch site "*e*" to be searched. This also would result in the retrieval of card 4.

FIGURE 29 shows the manner in which a five-bit field can be coded to represent thirty-one different bit combinations.

It will be understood that the number of bits in a field can be increased or decreased to meet the needs of a particular coding situation. For example, a thirty-five bit field might be established to handle the descriptors or vocabulary of a particular application, such as the aerospace field. Each document in such a system might be described with three to ten terms. Each of these terms is recorded or notched on the card representing the document. In many instances, the searching process is facilitated by coding these terms in a single field using superimposed coding.

In the coding system described, each of the five thousand descriptive terms are assigned a unique combination of three of the thirty-five bits available. For example, the word "stability" might be represented by bits 9, 21 and 34; whereas, the term "supersonic" might be represented by bits 6, 18 and 21. Since three bits are being used for each term, the fact that the two words have a common bit, bit 21, would not result in a false selection since at least one bit corresponding to each word is not common with the other word. In other words, a person seeking all documents relating to "stability" would not also obtain cards relating to "supersonic."

On the other hand, if there are a number of cards in the system coded with several descriptors, there is a possibility that a combination of various notches corresponding to different descriptors on one card will coincidentally match the coding being searched. This unwanted card will then be retrived with the wanted cards resulting in what is known as a "false selection." As a practical matter, however, the "false selection" problem is minimized when superimposed coding is used by making a search so that at least three or four descriptor terms are used in locating a document.

For example, suppose that there is a document in the file which discusses the stability of supersonic aircraft in the face of turbulence at low altitude. This document could be coded and retrieved using only the descriptor "stability." However, the use of a single descriptor might result in a false selection as well as in the retrieval of other documents of no interest, such as documents relating to the stability of barges, the stability of electrical circuits and the like. Hence, it is preferable to code the card and search for a plurality of descriptors including, for example, "stability," "supersonic," "aircraft," "turbulence" and "low altitude." By utilizing a number of descriptors, the probability of false selection is minimized and nonpertinent documents are eliminated. By using the present method and sorting apparatus, a file of for example twenty thousand cards representing twenty thousand documents can be searched for articles having each of six particular descriptors drawn from a vocabulary of twenty thousand descriptor terms in less than five seconds, including the time required to enter the appropriate codes through the console keyboard.

METHOD OF RETRIEVAL

The present method of separating cards utilizes the basic concept of parallel sorting of randomly filed cards by selective rejection against the force of a magnetic field disclosed in United States Patent No. 3,199,674 of Robert J. Kalthoff and Paul H. Ornstein for "Data Retrieval Apparatus And Method." However, the present method represents a substantial improvement over the earlier method and differs from it in many significant aspects.

Figure 5:
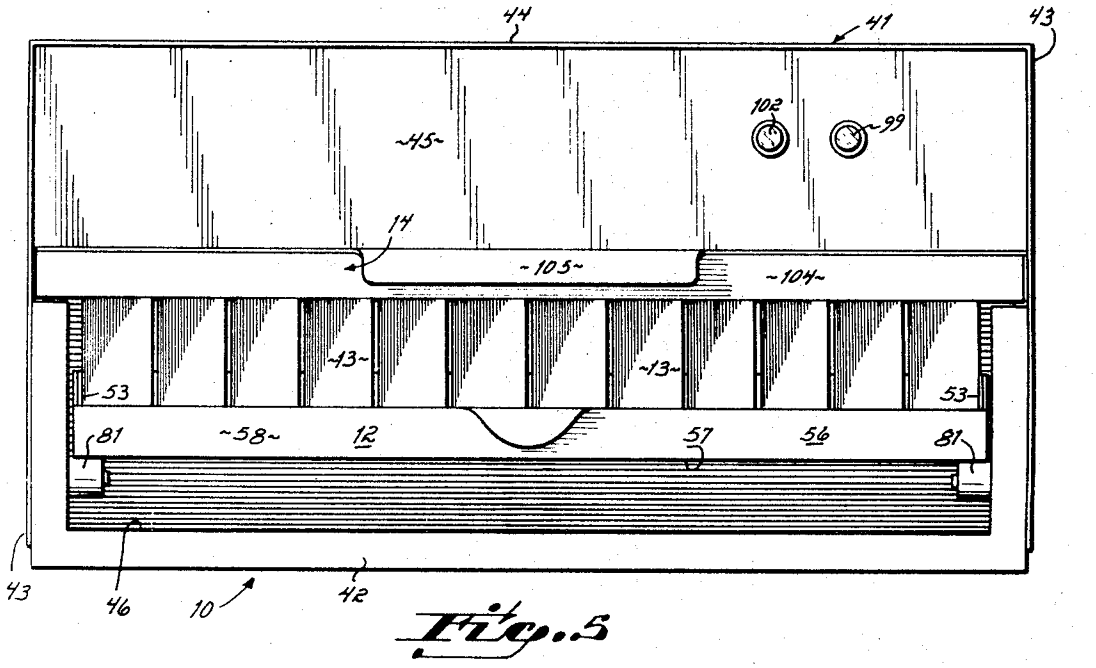
FIGURE 5 is a front elevational view of a selector unit with the cards and tray in an elevated, or sorting, position.
Figure 6:
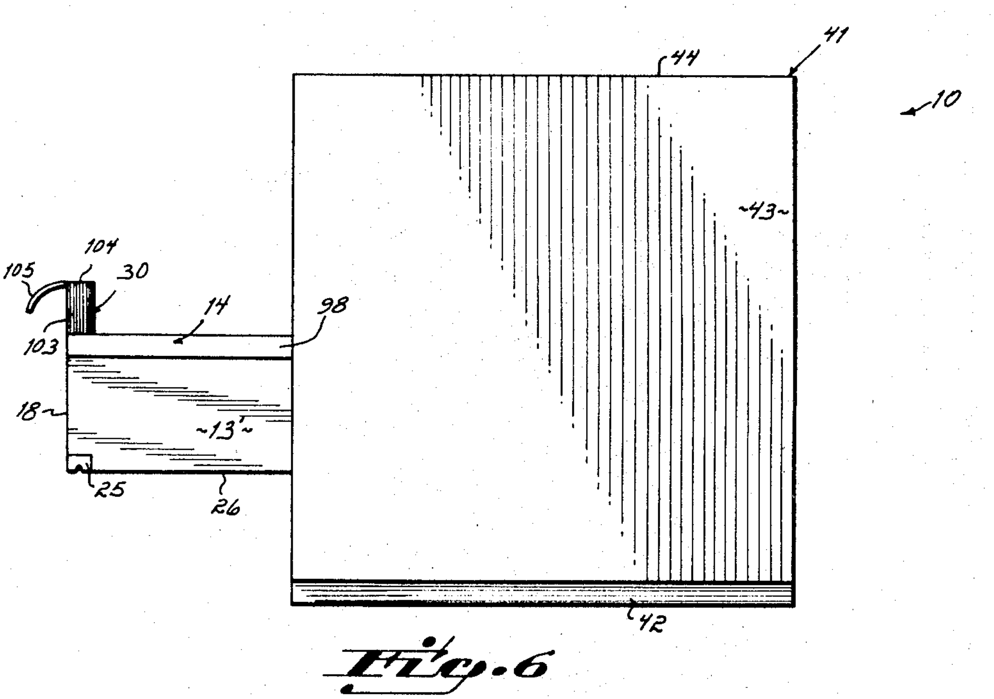
FIGURE 6 is a side elevational view of a selector with the card suspension frame extended to permit removal of the selected cards.

More particularly, for an understanding of the present sorting method, reference is made to diagrammatic views 7–12 and FIGURES 1, 5 and 6. As there shown, cards which have been coded by notching their sorting edges, in the manner exemplified by the card of FIGURE 4, are disposed, or stacked, in random order in a receptacle, such as tray 12. The cards are oriented so that their sorting edges 16 are the exposed uppermost edges of the cards. These sorting edges all extend parallel to one another as shown in FIGURE 1, for example.

To carry out a sorting operation, the entire stack of cards is raised into engagement with a suspension assembly. In the present selector mechanism for carrying out the method, this suspension assembly includes slide frame 14. The suspension assembly further includes two supporting elements, a longitudinally extending upper, or main, magnet 30 and a rearwardly disposed pivot rail 31. The pivot rail 31 projects inwardly into the pivot notch 22 of each of the cards and, hence, is effective to suspend the rear edges 21 of the cards. The main magnet 30 engages the metal implants 17 of each of the cards and thus suspends the upper edges of the cards. The cards are aligned by means of a guide bar 32 which engages the locator notches 20 formed on the sorting edges of the card. The position of the cards as they are brought into engagement with magnet 30 and pivot rail 31 is shown in FIGURES 8 and 5.

Figures 7, 8, 9, 10, 11, 12:
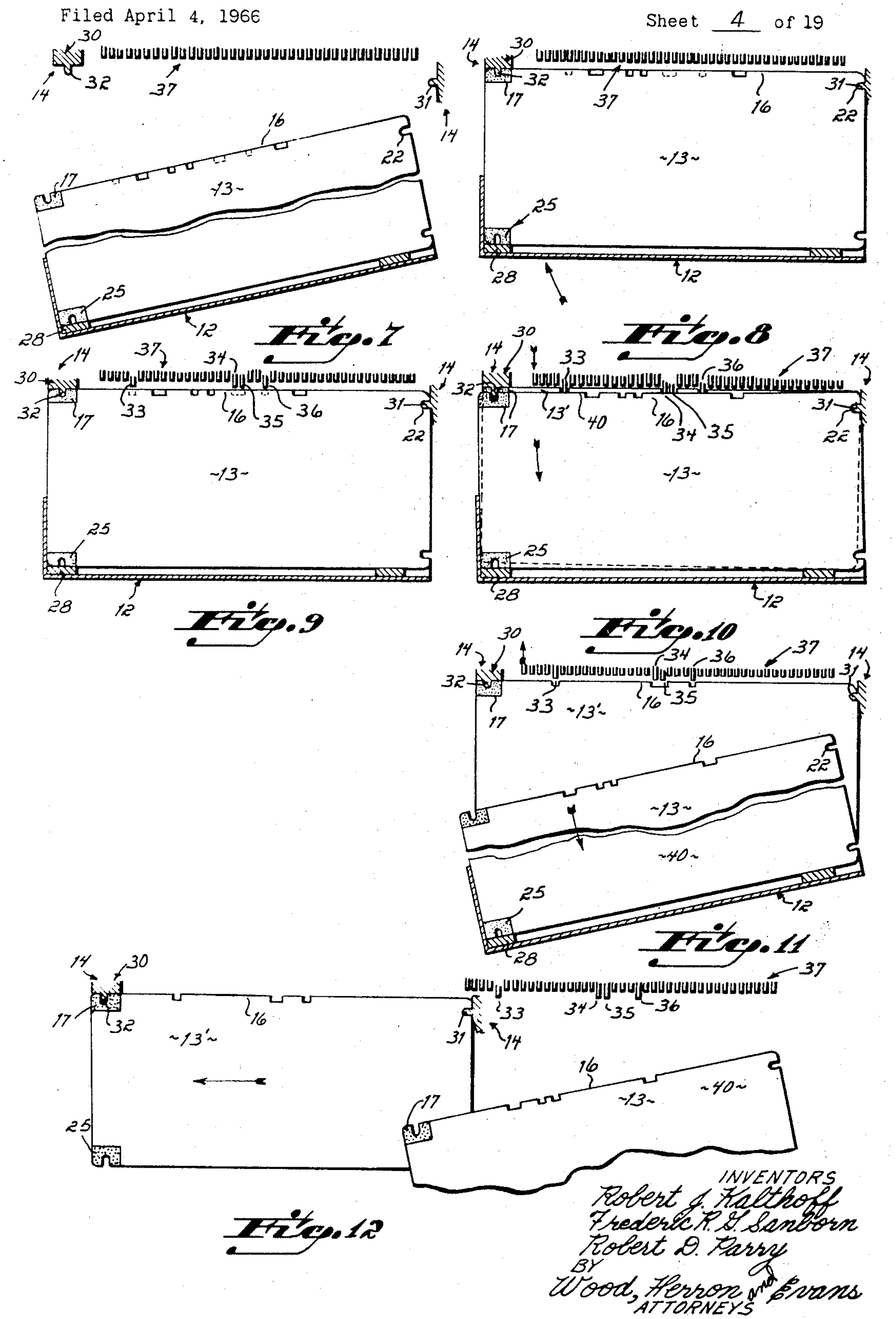
FIGURE 7 is a diagrammatic vertical cross sectional view showing a tray of cards and portions of the selector mechanism at the start of a selection cycle.
FIGURE 8 is a diagrammatic view showing the tray and cards in their fully raised position.
FIGURE 9 is a diagrammatic view showing the selector bars corresponding to the desired code in their advanced position relative to the remaining selector bars.
FIGURE 10 is a diagrammatic view showing the platen carrying all of the selector bars in its advanced, or lowermost, position in which the rejected cards have been separated from the upper magnet.
FIGURE 11 is a diagrammatic view in which the tray and rejected cards have pivoted downwardly leaving only the selected cards in engagement with the magnet, the platen having been retracted to disengage the selector bars from the cards.
FIGURE 12 is a diagrammatic view in which the card suspension frame has been pulled outwardly to withdraw the selected cards.

The cards, when suspended in the manner shown in FIGURE 9, are in a sorting position. The upper, or sorting, edges of the cards are parallel and form a generally horizontal plane. Each card has its inner edge pivotally supported on pivot bar 31 and has its outer, or free, edge suspended between two opposing magnetic fields. The predominate field is that of main magnet 30 tending to lift the card. The second field is the magnetic field of lower tray magnet 28 acting on lower metal implant 25 and tending to pull the card downwardly.

It is to be understood that the tray 12 and its supporting structure are free to move downwardly. More particularly, as explained below, in one preferred embodiment the tray is held in its elevated position by a light spring, the force of which is overcome by the weight of approximately one hundred cards resting in the tray. When this number, or more, cards are placed in the tray, it is moved downwardly to its original position.

When the cards are in the sorting position, the code corresponding to the desired card, or cards, to be retrieved is inserted into the selector by manipulating the keyboard of console 11 in a manner similar to that of a typewriter, adding machine or the like. In this step, the selector bars corresponding to the sites notched on the desired cards are advanced downwardly a distance slightly less than the maximum depth of the notches. It will be appreciated that there is one such sorting bar provided for each notch site. Thus, for a card having sixty-five notch sites, such as those shown in FIGURES 3 and 4, sixty-five sorting bars are provided. These bars extend parallel to one another with one bar being disposed over each notch site when the cards are raised to their sorting position as shown in FIGURE 8.

Assuming that in the diagrammatic example of FIGURES 7–12 it is desired to retrieve all cards notched in the 5th, 18th, 19th and 23rd notch sites. The corresponding selector bars 33, 34, 35 and 36 disposed in these sites are lowered or extended. These bars in their extended position are still spaced from the sorting edge of the stacked cards as shown in FIGURE 9.

In the next step of the method, the entire set of selector bars, indicated generally at 37, is lowered or advanced in unison toward the cards. The advanced selector bars 34–36 engage the sorting edges 16 of all cards which are not notched in the 5th, 18th, 19th or 23rd notch sites. These cards are forced downwardly out of the magnetic field of main magnet 30. However, the remaining card, or cards, such as card 13′, which does bear the desired code is not shifted from magnet 30 but remains suspended between magnet 30 and pivot rail 31 since the advanced selector bars freely enter the notches of card 13′ without shifting the card.

The rejected cards, such as card 40, are forced by the advanced selector bars a sufficient distance from the upper magnet 30 to break the magnetic field between that magnet and metal implants 17. These cards are subsequently firmly gripped, however, by the force of lower magnet 28 acting upon lower implants 25. The cards pivot about pivot bar 31 and the tray, which now carries the weight of the cards, starts to move downwardly at a controlled rate as shown in FIGURE 10. The tray continues to move downwardly until it returns to its initial position as indicated in FIGURES 11, 12 and 1.

In the next step of the method, the selector bar assembly is retracted in an upward direction to completely disengage the bars from the notches of selected card, or cards, 13′. The selected cards can then be disengaged by hand, or the suspension assembly can be pulled outwardly. This assembly carries the selected cards (which remain suspended between the main magnet 30 and pivot rail 31) as is shown in FIGURES 12, 1 and 6. When the slide frame is pulled to its outermost position, the selected cards can readily be inspected or disengaged by hand or by any suitable mechanism.

DATA RETRIEVAL APPARATUS

Figure 30:
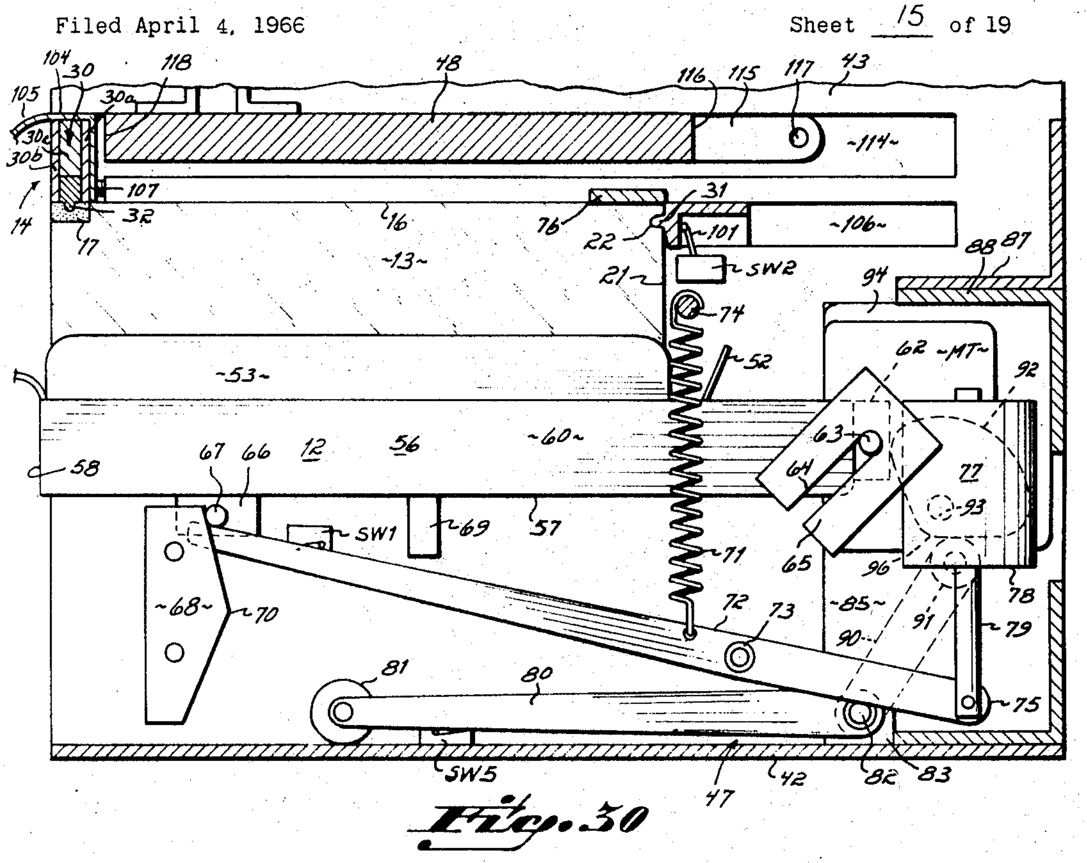
FIGURE 30 is a cross sectional view similar to FIGURE 16 showing the cards in a sorting position with the tray lifting arms disengaged from the tray.

The details of one preferred form of apparatus for carrying out the present data retrieval method are shown in FIGURES 1, 2, 5, 6, 13–25 and 29. More particularly, selector mechanism 10 comprises a housing 41 having a base 42, side walls 43, a top 44 and a front panel 45 leaving an enlarged front opening 46. Mounted within the housing 41 is the removable tray 12 adapted to support a large number of data cards 13, for example fifteen hundred. A tray lift mechanism indicated generally at 47 in FIGURES 15, 16 and 30 is provided for raising the tray from its lower position shown in FIGURE 1 to the sorting position shown in FIGURE 30.

Figure 13:
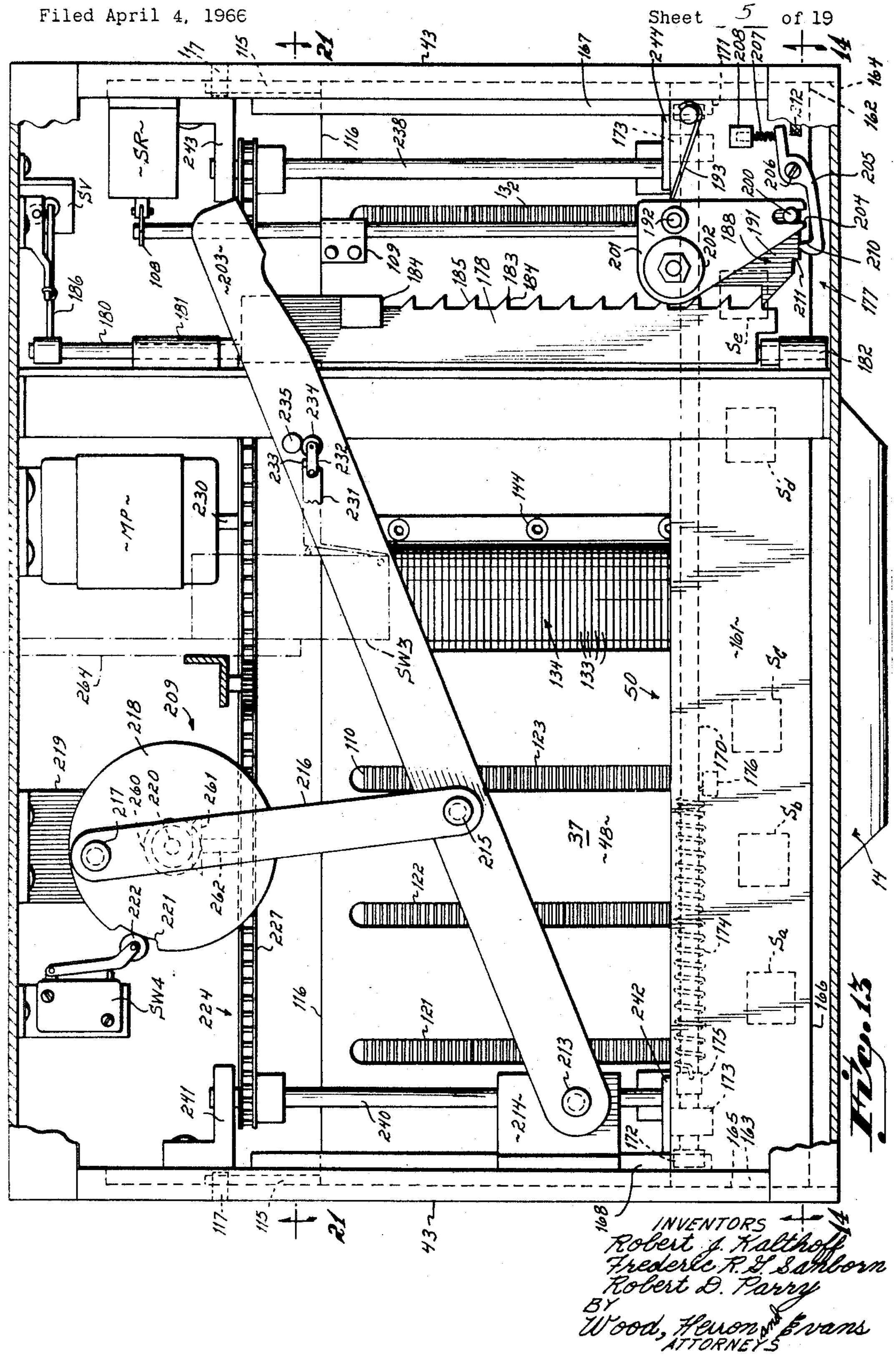
FIGURE 13 is a top view of a selector with the cover removed to show details of the operating mechanism.
Figure 14:
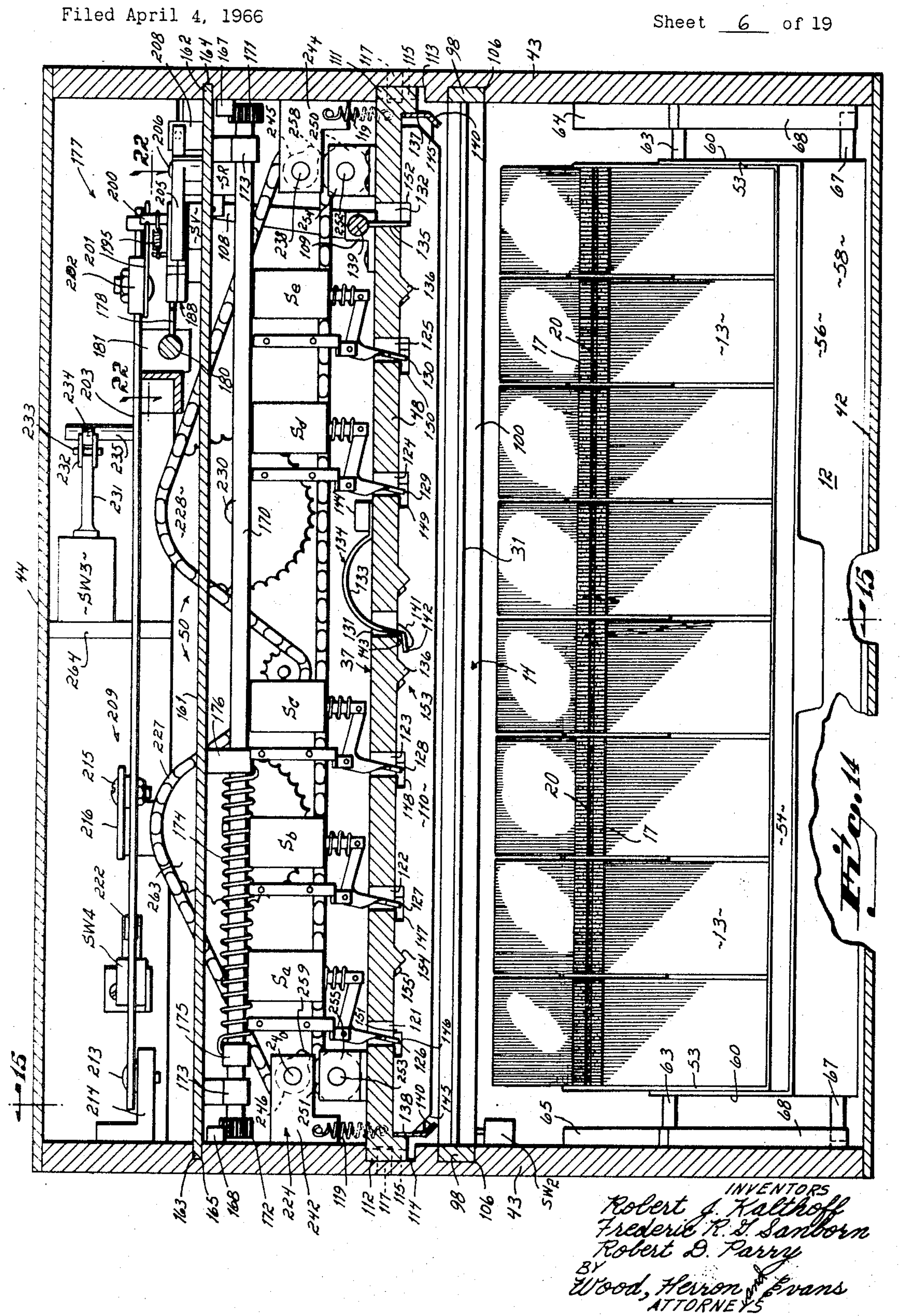
FIGURE 14 is a cross sectional view taken along line 14—14 of FIGURE 13.
Figure 15:
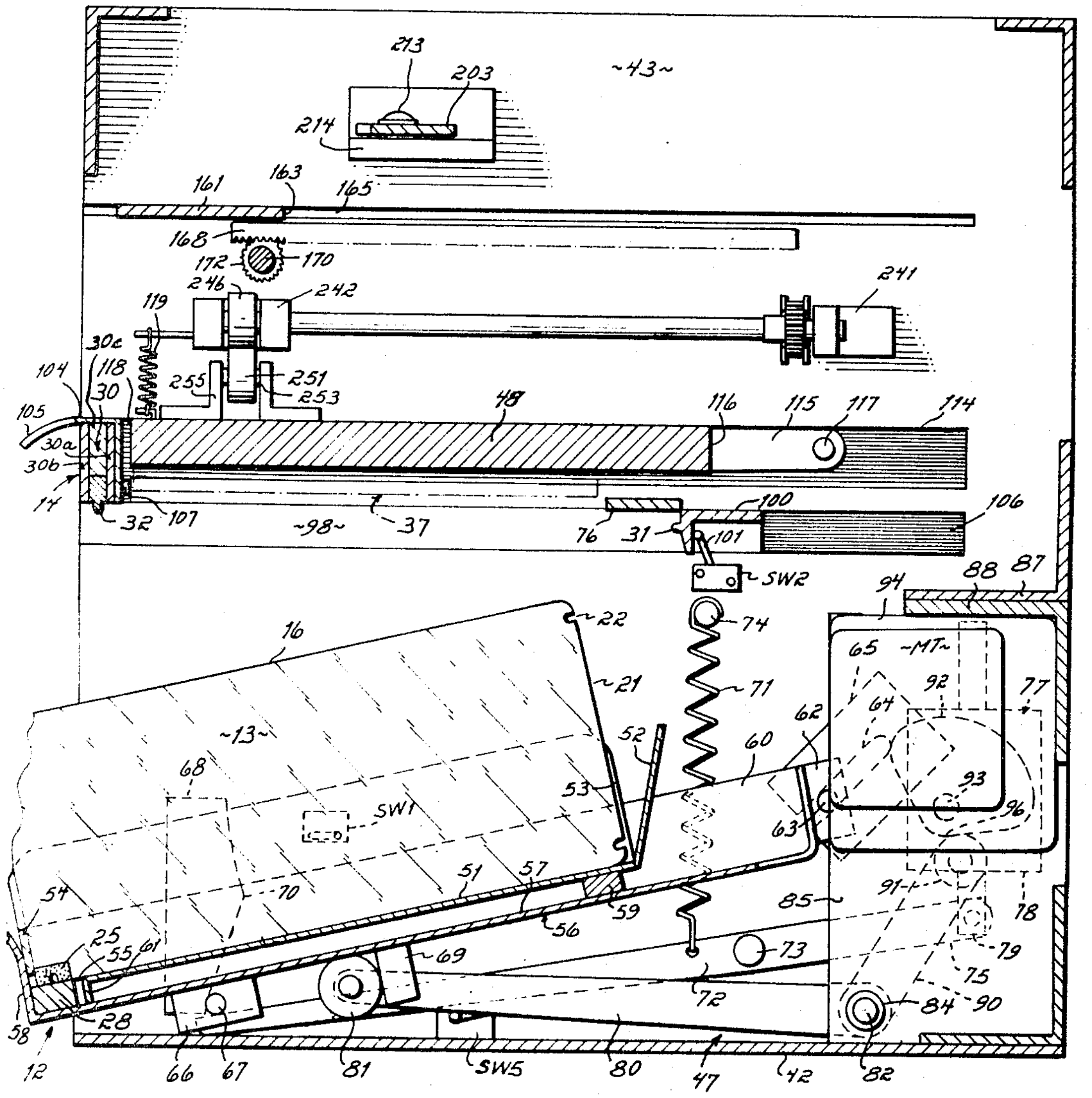
FIGURE 15 is a cross sectional view taken along line 15—15 of FIGURE 14.
Figures 16, 17:
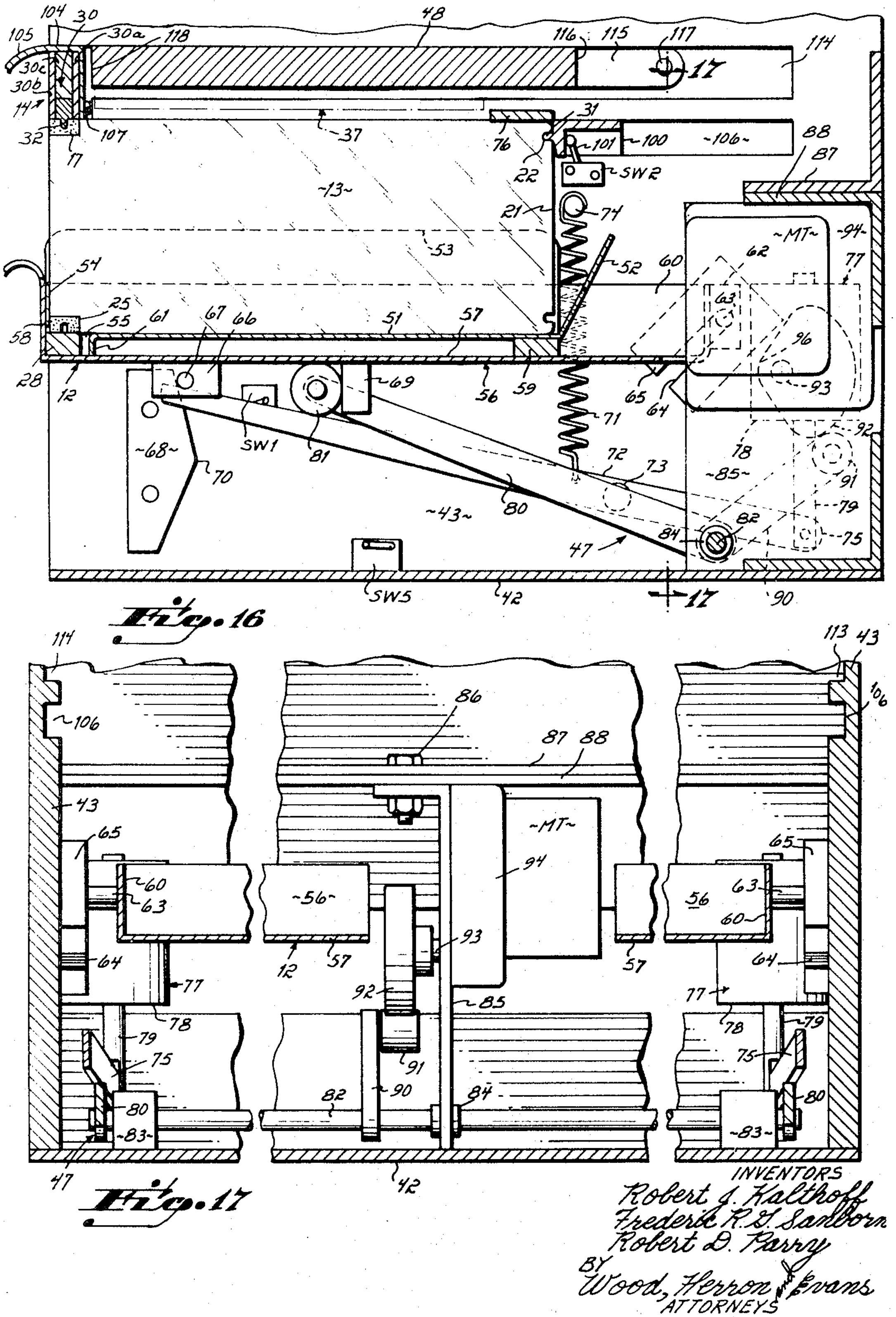
FIGURE 16 is a view similar to FIGURE 15 showing the tray and cards in an elevated position.
FIGURE 17 is a cross sectional view taken along line 17—17 of FIGURE 16.

The housing also encloses slide frame 14 which in turn carries both main magnet 30 and pivot rail 31 (FIGURE 15). The housing additionally supports the selector bar assembly 37 mounted above the cards in their sorting position (FIGURES 14, 16, 19 and 30). The selector bar assembly 37 is carried by a platen 48. The selector bars are selectively positioned by a selector bar setting mechanism indicated generally at 50 in FIGURES 13 and 14 and diagrammatically in FIGURES 32–34. As was indicated previously, operation of the selector bar setting mechanism and tray lift mechanism is controlled from console 11.

The details of construction of tray 12 and the tray lift mechanism 47 are best shown in FIGURES 5, 15–17, 30 and 31. As there shown, tray 12 comprises a flat bottom plate 51, an upwardly extending rear wall 52, which forms an obtuse angle with the bottom wall, and side walls 53. This rear wall limits rearward movement of the cards particularly when cards are being inserted in the tray 12. The tray further includes a front wall 54 which extends upwardly for a small fraction; for example, one-fourth of the height of cards 13. The bottom wall 51 of the tray is provided with an opening 55 adjacent front wall 54. This opening extends completely across the front of the tray and provides space through which lower magnet 28 can engage lower metal implants 25 of the cards within the tray.

Tray 12 is supported by tray lift mechanism 47. More particularly, tray 12 is adapted to be removably inserted within a tray support, or receptacle, 56. One preferred form of tray support is an open box-like receptacle having a bottom wall 57, a front wall 58 of approximately the same height as front wall 54 of the tray, and side walls 60. The tray 12 fits snugly between the side walls 60 but can be removed from the receptacle when desired. The bottom of the rear portion of the tray rests upon a spacer block 59 carried by bottom wall 57 of the tray support. The front portion of the tray is supported by means of a downwardly turned flange 61 which is formed adjacent opening 55 and rests on the bottom wall 57 of the receptacle.

The tray receptacle also carries the elongated lower magnet 28 which extends across the front portion of the receptacle beneath opening 55. This magnet is dimensioned so that its upper surface engages the lower magnetic implants 25 of cards disposed within tray 12.

The side arms 60 of the tray receptacle are provided with rearwardly extending flanges 62. Each flange in turn carries an outwardly extending pin 63. These pins reside in engagement with downwardly and forwardly angulated slots 64 formed in guide brackets 65 welded or otherwise secured to the inner surfaces of side walls 43 of the housing. Each side wall of the tray receptacle also carries a downwardly extending flange 66 carrying an outwardly extending follower pin 67. Each of the pins 67 tracks on a cam plate 68 bolted or otherwise secured to the inner surface of side wall 43 of the frame. As is best shown in FIGURE 16, each of the cam plates 68 is configurated to form a rearwardly extending center apex 70. Thus, the cam plate slopes rearwardly from the top to the center apex and slopes forwardly from the apex to the lowermost portion of the cam.

The tray support receptacle 56 is adapted to be held in its upper, or card sorting position (FIGURE 30), by means of springs 71 and arms 72 located on each side of the receptacle. More particularly, each of the arms 72 is pivotally mounted to one of the side walls 43 by means of pivot pins 73. The forward ends of each of the arms 72 engages the undersurface of one of the follower pins 67. The tension spring 71 is secured to each arm 72 forwardly of pivot pin 73. Each of the springs 71 extends upwardly and has its uppermost end secured to a pin 74 mounted on the side wall 43 in any suitable manner.

Each of the arms 72 also includes a rearwardly, or inwardly, extending portion 75 on the side of pivot pin 73 remote from spring 71. The end of each of these portions 75 is pivotally joined to a rod 79 extending downwardly from a suitable viscous damper, or the like, 77. The cylinder 78 of this damper is mounted in any suitable manner to the frame of the housing 41. The strength of spring 71 is such that it is overcome and the tray will pivot downwardly when subjected to the weight of a relatively small number of cards, for example one hundred. The function of damper 77 is to control the rate of downward movement of the tray.

The tray receptacle 56 is adapted to be raised from its lowermost position shown in FIGURE 15 to its uppermost position shown in FIGURE 16 by means of lift arms 80. Each of the lift arms 80 carries at its free end a roller 81, formed of Teflon or the like, which roller is adapted to engage the front surface of a lug 69 depending from the bottom wall 57 of the tray support 56 and the bottom wall 57. The inner, or rearward, end of each of the lift arms is rigidly secured to a rotatable shaft 82. Shaft 82 is journalled in stationary bearing blocks 83 mounted in any suitable manner upon base 42 of the housing and in a bushing 84 carried by a vertical plate 85 mounted in the rear center portion of the frame.

The upper end of vertical plate 85 is bolted as at 86 to inwardly extending flanges 87 and 88 formed on the frame. Pivotal shaft 82 carries a vertical arm 90. The upper free end of this arm in turn supports a follower roller 91 disposed to engage a drive cam 92. This cam is mounted upon the output shaft 93 of a gear reduction unit 94 driven by lift motor MT. As cam 92 is driven from its home position shown in FIGURE 15 to its maximum lift position shown in FIGURE 16, the arms 80 are caused to pivot in a clockwise position (FIGURE 16) to raise the tray. As cam 92 continues to rotate and is returned to its home position, lift arms 80 are lowered back to a position in which they rest on base 42 so that rollers 81 are completely disengaged from the tray support receptacle.

As shown in FIGURES 15 and 16, the tray support receptacle does not move in a strictly pivotal manner as it is raised to bring tray 12 to the card sorting position.

Rather, cam plate 68 and the angulated slots 64 in rear support bracket 65 combine to impart a compound motion to the tray receptacle. Referring to FIGURE 15, it will be noted that with the tray receptacle in its lowermost position, pins 63 are disposed at the lower end of angulated slot 64. As the tray is elevated, pivot pins 63 are shifted upwardly along the slot until when the tray is in its uppermost position the pins engage the uppermost ends of the slot. As a result, during the initial upward movement of the tray, the tray is shifted inwardly, or rearwardly, at the same time that it is elevated. This facilitates movement of the rear edges 21 of the cards over rail 31, thereby permitting the pivot notches 22 to receive the rail and the rear portions of the card to become seated. The rear upper edges of the cards are further guided into alignment as the tray is raised by means of a stacking bar 76 which is rigidly mounted in the housing and extends transversely over the entire width of the tray 12. Stacking bar 76 is disposed over the rear portion of the cards 10 and is effective to urge any raised card downwardly into alignment with the rest of the cards in the tray as the tray approaches its uppermost, or sorting, position. Any card which is displaced rearwardly will also be raised due to its engagement with wall 52. Any such card is cammed forwardly and downwardly by the cooperation of stacking bar 76 and wall 52.

Again, it will be noted that when the tray 12 is in the sorting position (FIGURE 30), the tray support is carried entirely by arms 72 and springs 71. Roller 21 is completely disengaged. This disengagement of rollers 81 is automatically effected as cam 92 completes one revolution by a circuit including switches SW1 and SW5. Switch SW1 is normally closed, but is opened when arms 72 reach their uppermost position.

The details of the motor energization circuit, including switches SW1 and SW5, are explained in detail in the copending patent application of Robert J. Kalthoff, Frederic R. G. Sanborn and Daniel J. Bandenburg for "Console and Control Circuit," Ser. No. 539,792, filed Apr. 4, 1966. The disclosure of that application is specifically incorporated herein by cross reference. Corresponding identifying symbols, such as "SW1" and "SW5" for example, have been given to corresponding electrical components in the two applications.

It is apparent from FIGURE 30 that when the lower portion 96 of the cam 92 is in contact with follower 91, the lift arms 80 are lowered so that rollers 81 rest on the base plate 42. When the rollers are in this position, the microswitch SW5 is actuated to open a circuit to the lift motor MT. Thus, the motor is prevented from continuing to operate cam 92 to again raise the lift arms into contact with the tray support.

When during a selection operation a sufficient quantity of cards, for example one hundred cards, are rejected and separated from magnet 30 so that they drop into the tray, the tray support 72 pivots downwardly. The rate of downward movement is controlled by dampers 77. During the final downward movement of the tray support, the tray support mechanism is also shifted outwardly because of the angle of slot 64 and the angle of cam plate 68 below apex 70. This latter outward movement results in the tray 12's projecting outwardly slightly from the housing so that the tray can readily be removed and replaced with a new tray if desired.

The cards are supported in the sorting position by means of a suspension assembly preferably in the form of slide frame 14. Slide frame 14 is shown in FIGURES 6, 14, 15 and 18. Essentially, this slide frame is a rectangular structure including two side arms 98 formed of bar stock or the like. These arms carry a rear transverse bar 100. This bar extends between the two side rails and is secured to the side rails in any suitable manner as by means of welding, bolts or the like. The forward edge of the transverse bar 100 is configurated to form pivot rail 31. This rail preferably is of slightly tapered and rounded cross section, as shown in FIGURE 15, to facilitate reception of the rail within pivot notches 22 of the cards. A rear surface of the transverse bar is adapted to engage the arm 101 of microswitch SW2 when the slide frame is fully inserted and, hence, properly positioned within the housing 41. This switch is effective to prevent the selector from initiating a sorting cycle unless the slide 14 and cards are properly positioned. When SW2 is closed, a light 102 lights in the front of the selector. A second light 99 is provided to indicate that power is being applied to the selector.

Figure 18:
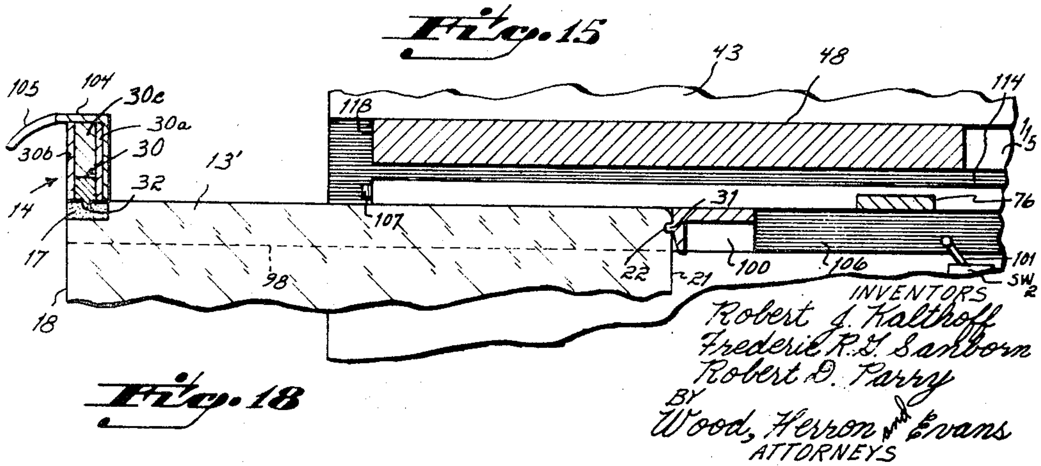
FIGURE 18 is an enlarged cross sectional view similar to FIGURES 15 and 16 showing a portion of the card suspension frame being withdrawn with the selected cards.

Each of the side arms 98 of slide frame 14 includes an inwardly extending flange 103 at its forward edge for supporting main magnet 30, handle member 104 and guide bar 32. As is best shown in FIGURE 18, in a preferred form magnet 30 actually comprises two parallel pole pieces 30*a* and 30*b* disposed on opposite sides of a permanent magnet member 30*c*. These pole pieces are disposed on opposite sides of a nonferromagnetic guide rail member 32. This member terminates in a downwardly extending rib, or rail, element 32 which is adapted to seat within the locator notches 20 formed in metal implants 17. Handle member 104 is an angle member formed of any suitable nonferromagnetic material which is secured to flanges 103 in any suitable manner, such as by means of bolts, and is configurated to form an arcuate handle portion 105 which facilitates pulling the slide frame outwardly. The two side arms 98 of the slide frame engage channel, or track, portions 106 formed in any suitable manner on the inner surface of each of the side walls 43 of the frame.

The slide frame can be pulled outwardly to an intermediate position, such as shown in FIGURE 6, in which the slide frame is still supported by channels 106, and yet the selected cards 13' are partially outside of the housing 41 for inspection or removal from the slide frame. The slide frame can also be shifted inwardly to the card sorting position. The frame is aligned in this position by the abutment of the flanges 103 with abutment screws 107 threaded into a rib formed on the inner face of the housing walls 43. When the slide frame is properly positioned in abutment with these stop screws, the locator rib 22 will be effective to position the cards 13 precisely in the proper relationship to the sorting bar assembly 37. When the slide frame is so positioned, microswitch SW2 is closed to condition the selector for a sorting cycle.

Figure 31:
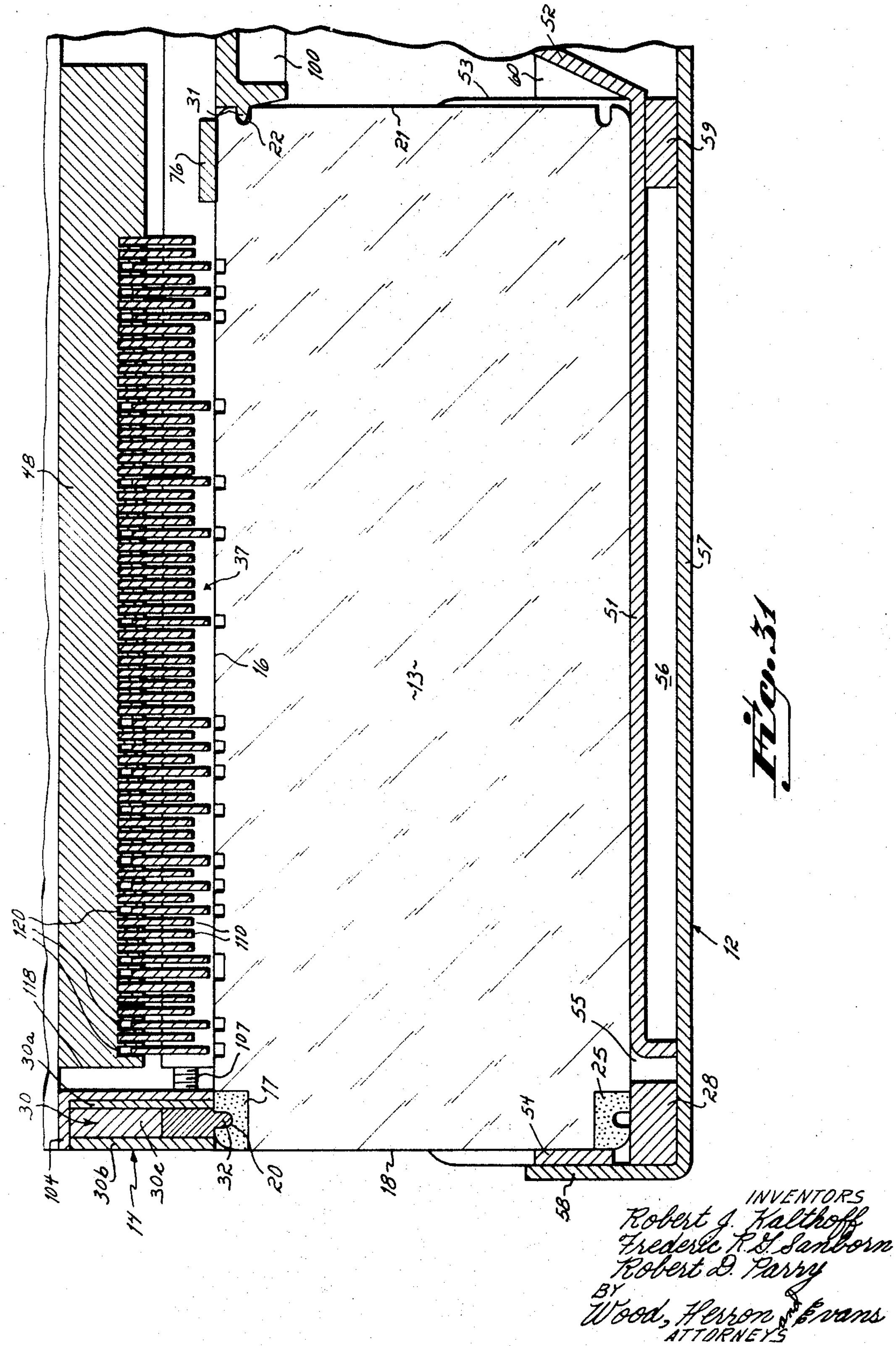
FIGURE 31 is a cross sectional view taken along line 31—31 of FIGURE 19 with portions of the mechanism being omitted for purposes of clarity.

The third major component of the selector mechanism is the selector bar assembly 37 and the associated bar setting and platen shifting apparatus. More particularly, as is shown in FIGURES 13, 14 and 31, the selector bar assembly comprises a plurality of parallel selector bars 110. The selector bars 110 are carried by the platen 48. Platen 48 is a rigid, rectangular member which extends in a substantially horizontal plane across a major portion of the width and depth of the selector. The two ends 111 and 112 of the platen are mounted for limited vertical movement within channels 113 and 114 formed on the side walls 43 of the selector housing.

As is shown in FIGURES 13 and 16, two rearwardly extending brackets 115 are mounted upon the rear edge 116 of the platen. These rearwardly extending bracket members are pivotally mounted on pins 117 carried by the side walls of the housing. The forward edge 118 of the platen is urged upwardly by means of tension springs 119 mounted adjacent to each forward corner of the platen, the springs having their upper ends carried by pins, bolts or the like, secured to the housing frame.

Platen 48 is provided with a plurality of parallel downwardly opening bar receiving slots 120 (FIGURE 31). These slots are effective to accurately align the selector bars 110 and to guide them during their limited vertical movements relative to the platen. These vertical slots are appreciably longer than the width of the card tray 12 so as to receive and support a selector bar 110 of a length at least equal to that of the tray and to provide for limited longitudinal movement of the selector bar within the slot in the manner explained below.

The platen 48 is also provided with a plurality of transverse actuator receiving slots 121–125. These slots are parallel to one another and extend at right angles to the bar receiving slots 120. The actuator receiving slots extend through the platen and provide access to the upper edges of the sorting bar 110. These slots are at least equal in number to the number of notch or bit spaces in a field. Each of the slots 121–125 is adapted to receive one of the bar setting fingers 126–130 respectively associated with the bar setting solenoids $S_a$, $S_b$, $S_c$, $S_d$ and $S_e$. In addition to these slots, the platen is provided with two additional transverse slots 131 and 132 which also extend at right angles to the sorting bars. Slot 131 is effective to receive the tines 133 of the bar supporting comb spring 134 while slot 132 is effective to receive reset blade 135.

The undersurface, or blade engaging surface, of the platen is provided with a series of V-shaped ribs 136. Each of these ribs projects downwardly for a small fraction, for example one-fourth, of the depth of a blade. The ribs 136 extend parallel to one another in a direction perpendicular to the extent of the blades. The undersurface of the platen also carries two downwardly extending and guide plates 137 and 138 mounted along the side edges of the platen. Each of these guide plates extends perpendicular to the selector bars 110 and includes an inwardly turned lower flange 140.

As is shown in FIGURES 14 and 31, each of the selector bars is mounted within longitudinal slots 120 so that the bar is disposed directly above one of the notch sites of a card 13 disposed within tray 12. Each of the selector bars 110 is provided with a center arcuate slot 141 for receiving one of the tines 133 of comb spring 134. Each of the tines includes a foot 142 which is disposed within the arcuate slot of a selector bar and fits under a lip 143 formed on the selector bar. Since the opposite end of the comb spring from foot 141 is bolted or otherwise secured as indicated at 144 of the upper surface of the platen, the comb spring is effective to mount each of the selector bars within one of the longitudinal slots 120 in such a manner that the selector bar can be shifted both longitudinally relative to the slot and can be advanced or retracted (vertically relative to the slot). The comb spring is effective to apply a restoring force to the selector bars, normally urging the selector bars to the left and up, i.e. toward a retracted position in FIGURES 14 and 32–34.

As shown in FIGURES 14 and 32–34, each of the selector bars 110 is a flat, elongated metal bar of a length longer than the length of tray 12. Preferably the lower end corners 145 of each selector bar are cut away. In addition to the centrally disposed arcuate slot 141 and lip 143, each of the selector bars is provided with five finger receiving slots 146–150. One of these slots is substantially narrower on each bar than the remaining slots. The location of the narrow slot on each bar depends on the bit value of the bar.

More particularly, in the preferred embodiment, all of the bars corresponding to the field bit "*a*" are adapted to be actuated by the $S_a$ solenoid through arm 126. These bars are not to be engaged by the fingers associated by the $S_b$–$S_e$ solenoids. It will be noted in FIGURES 14 and 32 that the $S_a$ solenoid finger 126 extends through the left-hand actuator receiving slot 121 in the platen and enters notch 147 in the selector bar. Thus, on the "*a*" bars the left-hand notch, or recess 147, is made only a fraction as long as the remaining notches to provide a tab-like portion 151 disposed for engagement with finger 126. The remaining notches of this selector bar are made appreciably wider to provide clearance space for fingers 127–130 associated with the other bit actuators $S_b$, $S_c$, $S_d$ and $S_e$.

In a similar manner, the selector bars associated with the "*b*" bits are configurated so that the second slot 147 is made narrower than the remaining slots for engagement with finger 127 actuated by solenoid $S_b$. The "*c*" bit bars have slot 148 narrowed, the "*d*" bit bars have slot 149 narrowed and the "*e*" bit bars have slot 150 narrowed.

Figure 20:
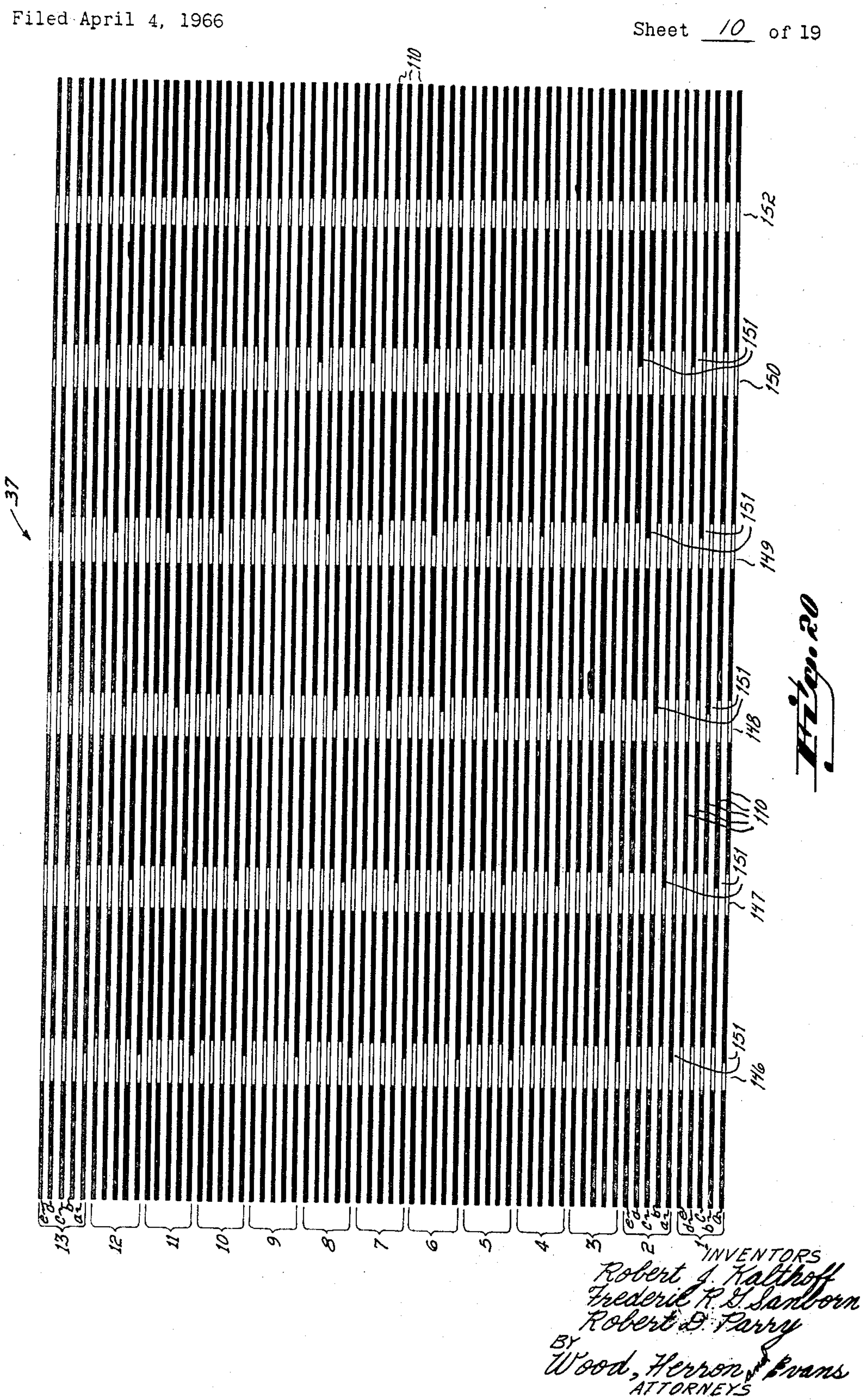
FIGURE 20 is a top view of the selector bar assembly.

The overall relationship of the selector bars showing the relative width of slots 146–150 and, hence, the location of tab portions 151 is best shown in FIGURE 20. As there shown, it will be seen that each of the bars 110 corresponding to an "*a*" bit in the fields 1–13 is provided with a narrow slot 146, or viewed differently is provided with a tab only in connection with the 146 slots. These tabs are in registry with the left-hand actuator receiving slot 121. Similarly, each of the bars 110 associated with the "*b*" bit has as its narrow slot, the second slot from the left, i.e. slot 147, or, again viewed differently, the tabs 151 are associated with the slots 147. Similarly, the "*c*" bit bars have slots 148 narrowed, the "*d*" bit bars have slots 149 narrowed, and the "*e*" bit bars have slots 150 narrowed. Each of the bars also is provided with a reset slot 152 for receiving reset blade 135.

Figure 32:
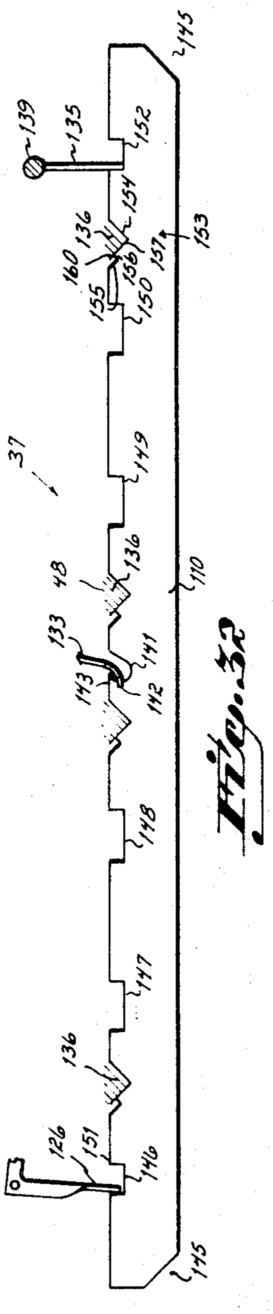
FIGURE 32 is a diagrammatic view of a selector bar and its associated actuating elements showing the selector bar in its retracted, or elevated, position.

In addition to the slots mentioned above. each bar 110 is provided with a plurality of double V-shaped notch sets 153. Each notch set 153 includes a deep notch 154 and a shallow notch 155 spaced adjacent to notch 154 with the side wall 156 of notch 155 intersecting the side wall 157 of notch 154 at approximately the mid point thereof. Each large notch 154 of the notch set is of substantially the same size as V-shaped rib 136 formed on the undersurface of the platen. Moreover, the large notches are spaced so that when the bar 110 is in its retracted position as shown in FIGURES 14 and 32, the ribs 136 are received within the notches 154 and the selector bars abut the undersurface of platen 48. However, when the selector bars are shifted slightly to the right (in a manner explained below), the ribs 136 are engaged in the shallow notches 155 so that the bars are spaced from the platen and project downwardly in the manner shown in FIGURES 19 and 33. In either position the bars are spring urged upwardly into contact with the ribs by means of the tines of comb spring 134.

Figure 33:
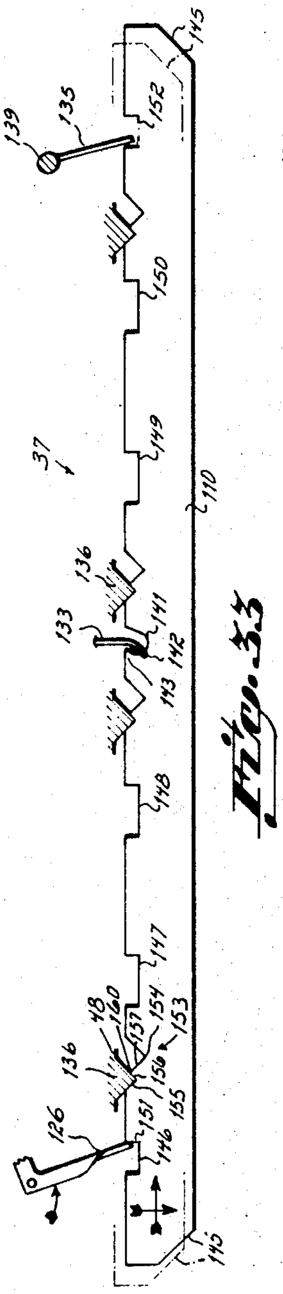
FIGURE 33 is a diagrammatic view similar to FIGURE 32 showing the sorting bar shifted to its advanced, or lowered, position.
Figure 34:
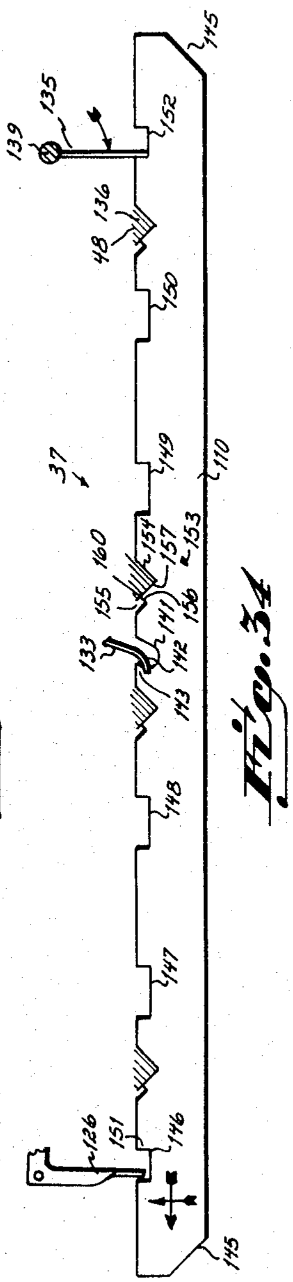
FIGURE 34 is a diagrammatic view similar to FIGURE 32 showing the sorting bar returned to its upper, or retracted, position.

Each of the selector bars 110 is adapted to be projected, or advanced, from its retracted position shown in FIGURE 32 to its projecting, or advanced, position shown in FIGURE 33 by means of one of the solenoid operated actuating fingers 126–130. For example, the bar shown in FIGURES 32–34 is an "*a*" bar. Thus, the left-hand slot 146 is a narrow slot having tab portion 151 associated with it. This bar is adapted to be actuated by finger 126 associated with the $S_a$ solenoid. In the normal retracted position, the bar is shifted to the left and up under the action of tines 133 of comb spring 134. With the bar in this position, ribs 136 are disposed within the large notch 154 of each notch bar. The "*a*" bars 110 are lowered, or advanced, as shown in FIGURE 33 in response to the counterclockwise pivotal movement of finger 126.

This finger in engagement with tab portion 151 forces the bar 110 to the right. At the same time, the bar is cammed downwardly by the abutment of rib 136 with the angulated wall 157 of slot 154. After the crest, or apex, 160 between each pair of notches passes under rib 136, the bar seats itself on the rib so that the smaller notch 155 receives the rib and retains the selector bar 110 in a position in which it is shifted to the right and projected downwardly from its original position.

Each of the selector bars is returned simultaneously to its retracted position by the action of reset blade 135. As is shown in FIGURE 34, reset blade 135 (which incidentally passes downwardly through slot 132 in the platen and engages the reset slot 152 in each of the bars) is pivoted in a clockwise direction to force the bars 110 downwardly and to the left. Reset blade 135 is turned by a shaft 139 rotatably mounted in bushing brackets 109 bolted or otherwise secured to the upper surface of platen 48. The reset blade is connected by link 108 to the armature of reset solenoid SR rigidly mounted upon side plate 43. When the solenoid is unenergized, the reset blade is free to pivot in a counterclockwise direction from that shown in FIGURE 32 to that shown in FIGURE 33. However, when the reset solenoid SR is energized, shaft 139 and reset blade 135 are pivoted in a clockwise direction to the position shown in FIGURE 34 to force blades 110 to the left.

As the bars move to the left, each bar is initially cammed downwardly by the engagement of the V-shaped ribs 136 with angulated notch sides 156. Again, however, after the apex 160 of each notch pair passes under the rib 136, the selector bars 110 are free to move upwardly under the influence of tines 133 so that the bars are returned to their upper, or initial, position.

Figure 35:
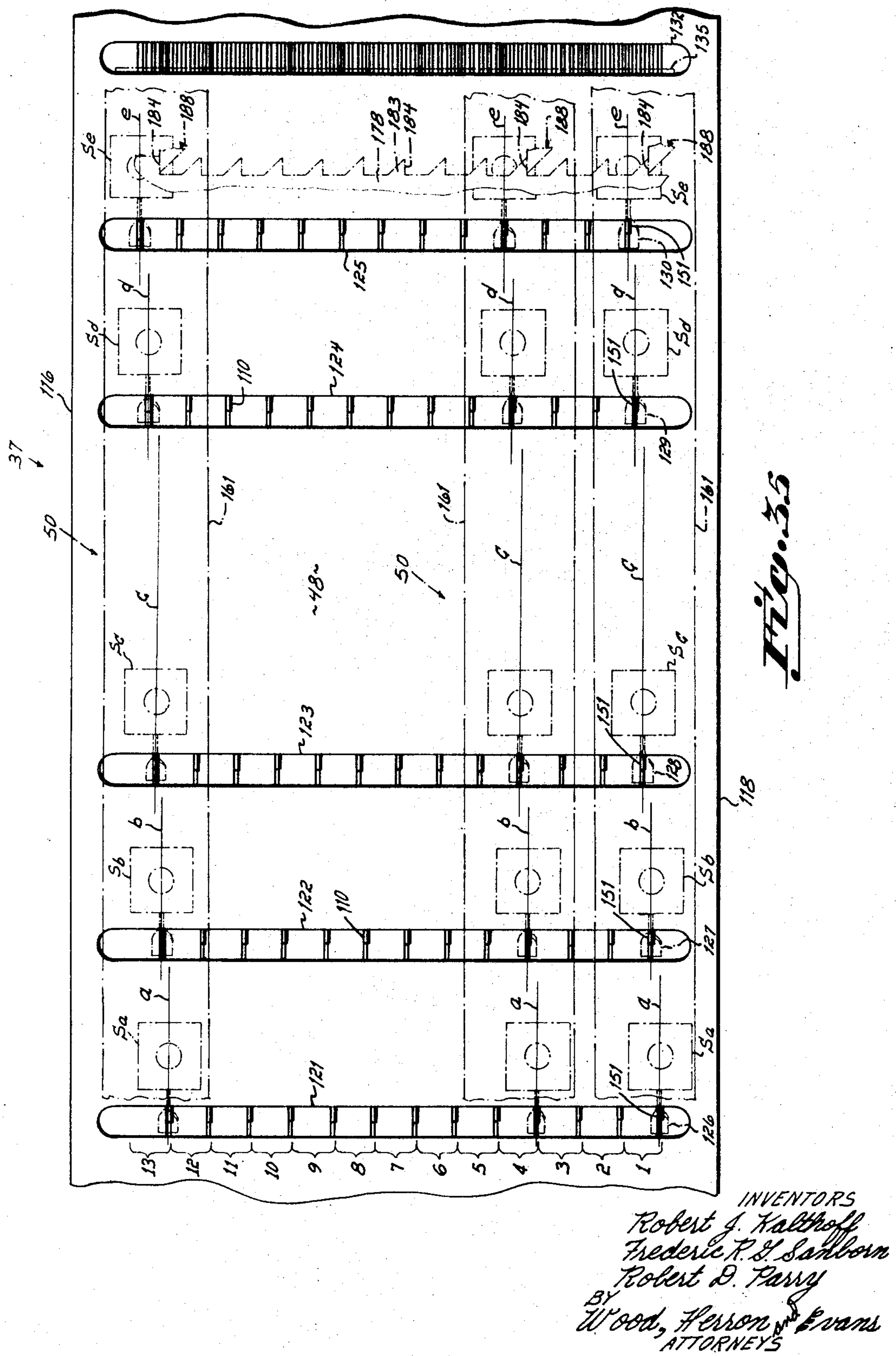
FIGURE 35 is a diagrammatic top plan view of the slide plate and platen.

As was indicated previously, each of the selector bars 110 is positioned through selective actuation of one of the solenoids $S_a$–$S_e$. These solenoids are in turn energized in response to operation of various keys on the keyboard of console 11. As shown in FIGURES 13, 14 and 35, each of the solenoids $S_a$–$S_e$ is mounted on a carriage 161. This carriage includes side edges 162 and 163 guided in tracks 164 and 165 formed on side walls 43 of the housing. The carriage preferably includes a depending wall 166 on which the solenoids $S_a$–$S_e$ are mounted.

Carriage 161 is adapted to be shifted forwardly and rearwardly within the housing from a position in which the solenoids are effective to engage the bit bars *"a," "b," "c," "d,"* and *"e"* of field 1 at the front of the machine to a position in which the fingers associated with the solenoids are effective to engage the selector bars associated with field 13 and the rear of the machine. More particularly, the carriage is adapted to be advanced rearwardly in incremental distances equal to the distance between corresponding bars of adjacent fields; for example, the distance between the *"a"* bars in fields 1 and 2. The carriage is returned to its home position over the "one" field in a single continuous motion.

More particularly, the incremental drive for the carriage includes racks 167 and 168 mounted along the inner edges of the side walls below guide slots 162 and 163. The carriage supports a longitudinally extending shaft 170 having pinions 171 and 172 mounted on the ends thereof in engagement with these racks. Shaft 170 is journalled in depending bushings 173 mounted in any suitable manner on the undersurface of the carriage 161. The shaft 170 is spring urged by a torsion spring 174. One end of torsion spring 174 is held in a collar 175 mounted upon shaft 170, while the other end of torsion spring 174 is mounted on a collar 176 rigidly secured to a bracket associated with the carriage 161.

Torsion spring 174 is effective to rotate shaft 170 so as to shift the carriage 161 from the front to the rear of the housing when the carriage is not restrained by a ratchet and pawl mechanism 177. The ratchet and pawl mechanism indicated generally at 177 in FIGURES 13, 22 and 23 and 24 functions as an intermittant, or step-by-step escapement or carriage advancement control element. Essentially, this mechanism is effective to cause carriage 161 to be advanced from a position in which the actuating fingers 126–130 engage the sorting bars in one field to a position in which the actuating fingers engage the corresponding selector bars in the next adjacent field.

More particularly, ratchet mechanism 177 comprises a ratchet bar 178 mounted upon a shaft 180. Shaft 180 extends from the front to rear of the housing perpendicular to the plane of the sorting bars. Shaft 180 is journalled in stationary bushings 181 and 182 mounted upon the housing in any suitable manner. Ratchet bar 178 is provided with twelve teeth 183. Each of the teeth 183 is configurated to form an abutment surface 184 extending perpendicular to the longitudinal extent of the rack and an angulated surface 185 intersecting the perpendicular abutment surface and being disposed on the side of that surface toward the rear of the housing. A thirteenth abutment surface 184 is also formed on the rack rearwardly of the last tooth 183. The thirteen abutment surfaces 184 are equally spaced and correspond to the thirteen fields into which the sorting bars are grouped. The spacing between each abutment surface 184 corresponds to the spacing between corresponding sorting bars, e.g. the *"a"* bars in adjacent fields.

The angular position of ratchet bar 178 and shaft 180 is controlled by a linkage 186 actuated by advance solenoid SV. When advance solenoid SV is energized, shaft 180 is rotated clockwise in FIGURES 14 and 21 to cause abutment 184 of ratchet bar 178 to be pivoted downwardly. Linkage 186 is spring loaded so that when it is deenergized, shaft 180 is reutrned to its original position, i.e. pivoted in a counterclockwise position shown in FIGURE 14, i.e. to raise the ratchet bar 178.

Ratchet bar 178 cooperates with a double pawl assembly 188. This assembly is shown in FIGURES 13, 22, 23 and 24. More particularly, double pawl assembly 188 is mounted upon carriage 161. The double pawl assembly includes a lower pawl finger 190 and an upper pawl finger 191. The pawl assembly 188 is pivotally mounted upon pin 192 and is spring urged into engagement with ratchet bar 178 by means of spring 193.

The upper pawl finger 191 is in turn pivotally mounted upon the lower pawl finger as by means of pivot pin 194. The upper finger 191 is spring urged in a clockwise position in FIGURE 22 by means of a tension spring 195 having one end secured to a pin 196. This pin rides in a generally triangular slot 197 formed in the upper pawl finger 191 and a transverse slot 198 formed in the lower pawl finger 190. Pin 196 is carried by a block 199 interposed between the slide plate 161 and lower pawl finger 190. The opposite end of spring 195 is joined to a pin 200 rigidly secured to the upper finger 191.

Figure 24:
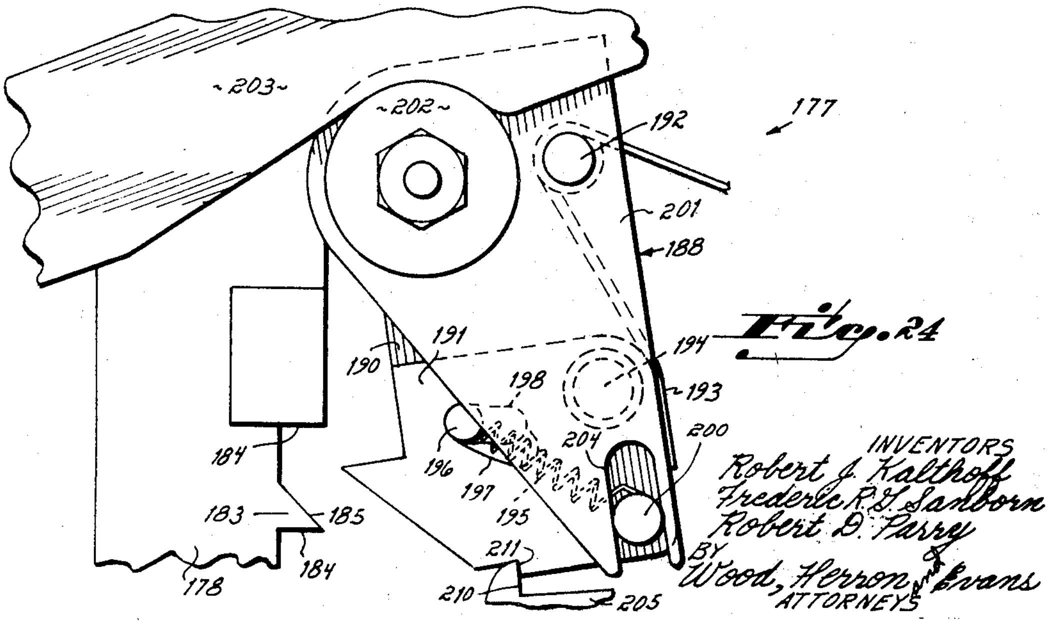
FIGURE 24 is an enlarged top plan view of a portion of the mechanism of FIGURE 22 showing the pawls locked out of engagement with the ratchet bar.

In addition to these elements, the pawl assembly comprises a retractor plate 201 disposed above both pawl fingers. The retractor plate is also pivotally mounted for rotation about pin 192 and includes an upstanding follower roller 202 adapted for engagement with reset bar 203. The plate 201 is provided with an elongated slot 204 which receives upstanding pin 200. As shown in FIGURE 24, when the follower roller 202 of the plate 201 is engaged by the reset bar 203, the plate is caused to rotate in a counterclockwise direction and is effective to retract both fingers 190 and 191 in unison from engagement with the ratchet arm 178.

The pawl fingers are temporarily latched in this position by means of a hook member 205 which is pivotally secured to carriage 161 as at 206. The hook member is spring urged in a clockwise direction by means of a compression spring 207 compressed between one end of the hook member and a stationary socket 208. This spring is normally effective to urge the hook member in a clockwise direction (FIGURE 13) so that when the pawl fingers 190 and 191 are retracted, the hook end 210 engages abutment shoulders 211 formed on each of the fingers. At the end of the forward or return movement of carriage 161, however, the end of the hook member 205 remote from end 210 engages a stationary abutment 212. This abutment is effective to force the hook member to rotate in a counterclockwise direction disengaging hook 210 from the pawl fingers and allowing those fingers to pivot in a clockwise direction under the influence of spring 193 into engagement with the most forward tooth 183. This positions the carriage over the selector bars in the first field.

The normal operation of the ratchet and pawl mechanism is illustrated in FIGURE 13. Assuming that the carriage 161 is in its initial, or home, position, the ratchet bar 178 is in its elevated position and the upper pawl finger 191 is engaged by the most forward tooth 183. As is shown diagrammatically in FIGURE 35, when the slide plate is in this position, the solenoid actuating fingers 126–130 operated by the selector bar actuating solenoids $S_a$–$S_e$ are in respective engagement with the *"a," "b," "c," "d"* and *"e"* bit bars of the first field.

Figure 22:
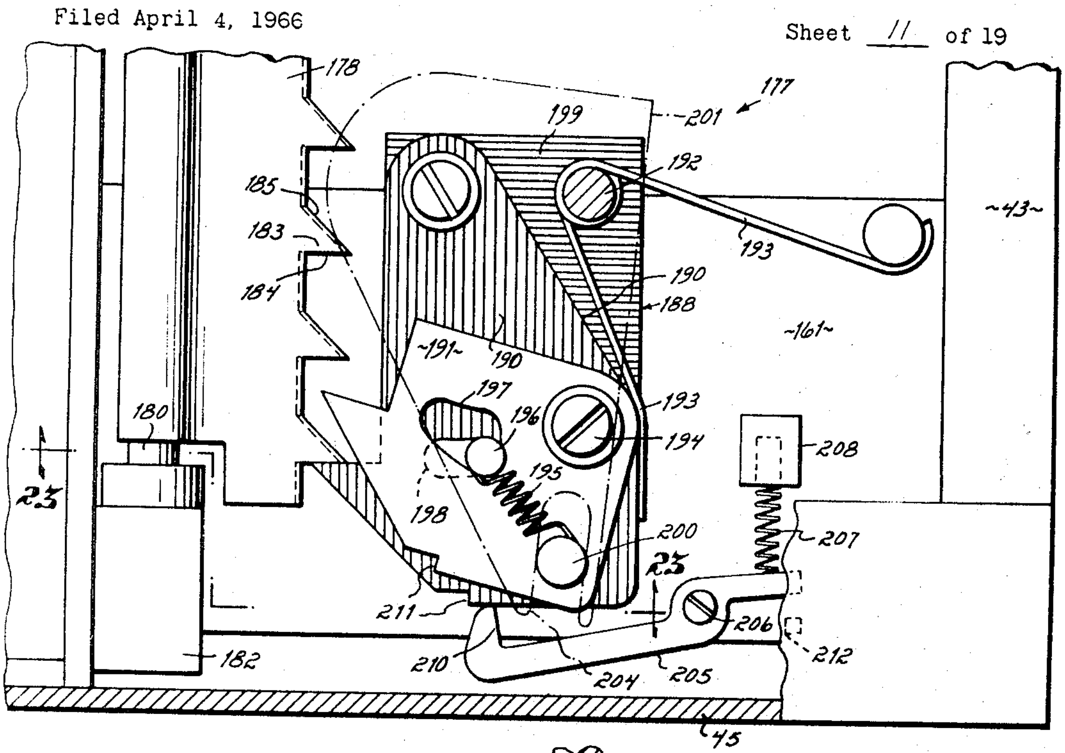
FIGURE 22 is an enlarged cross sectional view of the stepping mechanism taken along line 22—22 of FIGURE 14.
Figure 23:
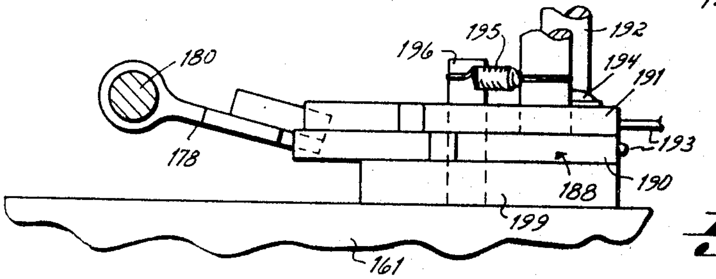
FIGURE 23 is a cross sectional view taken along line 23—23 of FIGURE 22.

When the advance solenoid SV is energized, shaft 180 is rotated to cause teeth 183 to pivot downwardly. The teeth thus are disengaged from the upper pawl member 191. They are, however, in engagement with the lower pawl 190. Thus, the carriage 161 is restrained from advancing (rearward) movement. As is shown in FIGURE 22, the upper finger 191 is pivoted in a clockwise direction into the interdental space between the first and second teeth.

When advance solenoid SV is deenergized, shaft 180 is spring urged in a direction effective to cause teeth 183 to be raised. During this movement, the front tooth 183 is disengaged from the lower pawl finger 190 and is repositioned in the path of the upper pawl finger 191. The carriage 161 is thus freed for advancing (rearward) movement under the influence of torsion spring 174. This spring advances carriage 161 by rotating shaft 170 and its two end pinions 171 and 172 in engagement with stationary racks 167 and 168.

The carriage moves rearwardly until upper pawl finger 191 is brought into engagement with the abutment surface 184 of the second tooth 183. Thus, the carriage 161, solenoids $S_a$–$S_e$, and actuating fingers 126–130 have been advanced a distance corresponding to one field, i.e. actuators 126–130 now respectively engage the *"a"–"e"* selector bars in the second field. The carriage 161, solenoids $S_a$–$S_e$ and their actuators can be advanced incrementally through each of the thirteen field spaces in this manner by successive actuation of the advance solenoid SV.

FIGURE 35 shows the carriage and solenoids as they are positioned for actuation of the sort bars in the first, fourth and thirteenth fields. After a sorting cycle, the carriage 161 and the solenoids which it carries are returned to their home position over the first field by means of a reset mechanism 209 shown in FIGURE 15.

Figure 21:
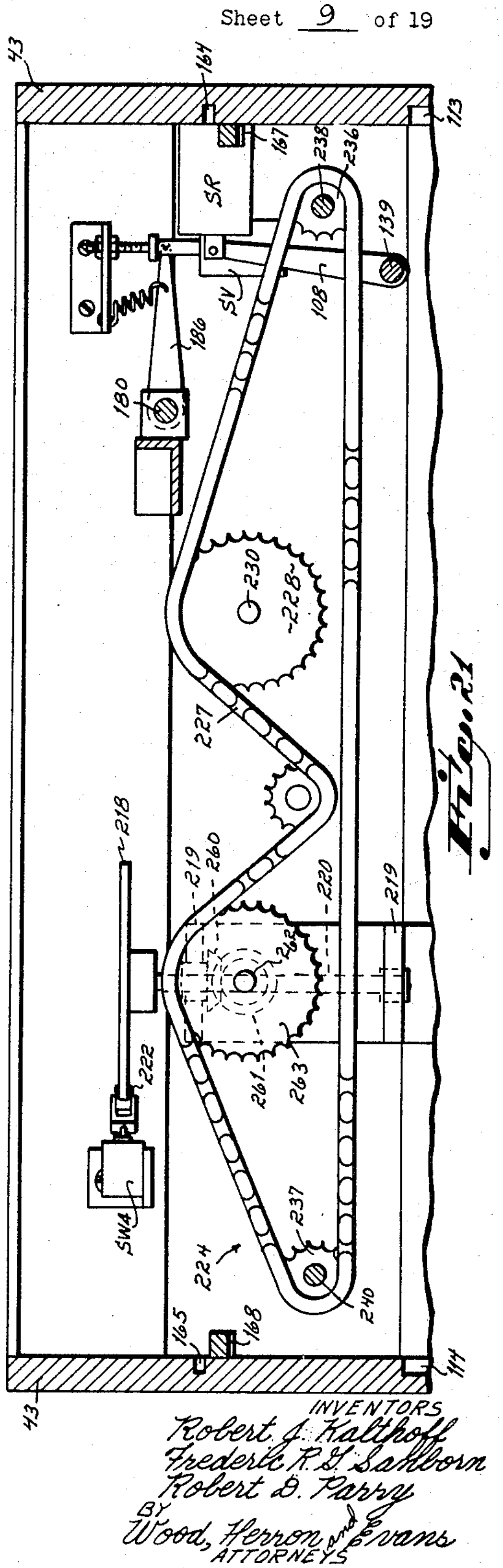
FIGURE 21 is a cross sectional view taken along line 21—21 of FIGURE 13.

This reset mechanism includes reset bar 203, one end of which is pivotally mounted upon a pin 213 secured to a bracket 214 disposed within the housing remote from ratchet and pawl mechanism 177. Reset bar 203 is pivotally secured at an intermediate portion by means of a pin 215 to a drive link 216. The opposite end of link 216 is in turn pivotally secured by means of pin 217 to a rotatable cam plate 218. As shown in FIGURE 21, plate 218 is carried by a vertical shaft 220 journalled in brackets 219. Shaft 220 carries a bevel gear 260 in engagement with a gear 261 carried by stub shaft 262. This shaft 262 also carries a sprocket 263 in engagement with a drive chain 227 driven by platen motor MP.

Plate 218 is provided with a peripheral recess 221. The periphery of this plate is contacted by follower 222 on the arm of a one revolution hold-in switch SW4 in the energization circuit of platen motor MP. Another control switch associated with the reset mechanism 209 is switch SW3 mounted upon a bracket 264. Switch SW3 includes an arm 231 having a pivoted outer section 232 which can be pivoted in a forward direction, but which is spring urged rearwardly against a stop 233. Pivot switch arm portion 232 carries a roller 234 disposed for engagement with upstanding projection 235 carried by reset arm 203. When the reset arm moves forwardly, it causes arm portion 232 to bend without actuating switch SW3. When, however, the projection 235 engages the switch arm while moving in a rearward direction, the switch arm is caused to be shifted inwardly (to the left in FIGURE 13) to actuate switch SW3 indicating that arm 203 has returned to its fully retracted position and that the carriage 161 is over the first field of the platen.

The selector also further includes a platen advancing or lower mechanism indicated generally at 224 in FIGURES 13, 15 and 21. This mechanism includes platen motor MP which is effective to drive the chain 227 through a sprocket 228 mounted upon output shaft 230 of the motor. Chain 227 is in turn trained over sprocket 263 and sprockets 236 and 237 carried by shafts 238 and 240 respectively. Shafts 238 and 240 extend from front to rear of the selector and are pivotally journalled in bearing brackets 241–244. Each of the shafts carries an eccentric cam 245, 246.

The cams 245 and 246 are disposed above follower rollers 250 and 251 mounted upon shafts 252 and 253 carried by brackets 254 and 255 mounted upon the upper surface of platen 48. When the cams 245 and 246 are positioned with their low portions in engagement with the rollers 250 and 251 as shown in FIGURE 14, the platen is in its elevated position. However, when the cams are rotated so that their high points 258 and 259 are in engagement with the follower rollers 250 and 251, the platen is forced downwardly so that the selector bars are forced into engagement with cards not having notches conforming to the array of advance selector bars.

OPERATION

In order to aid a complete understanding of the present system, a typical sorting operation will be described in detail. Assume that an operator utilizing a system of the type shown in FIGURE 2 desires to set up the machine to retrieve a card coded in the first nine fields in the same manner as the card shown in FIGURE 4. It will be understood at this point that a collection, or stack, of cards bearing various codes have been filed in random order in one or more trays 12 which have been inserted in one or more of the selectors.

Figure 25:
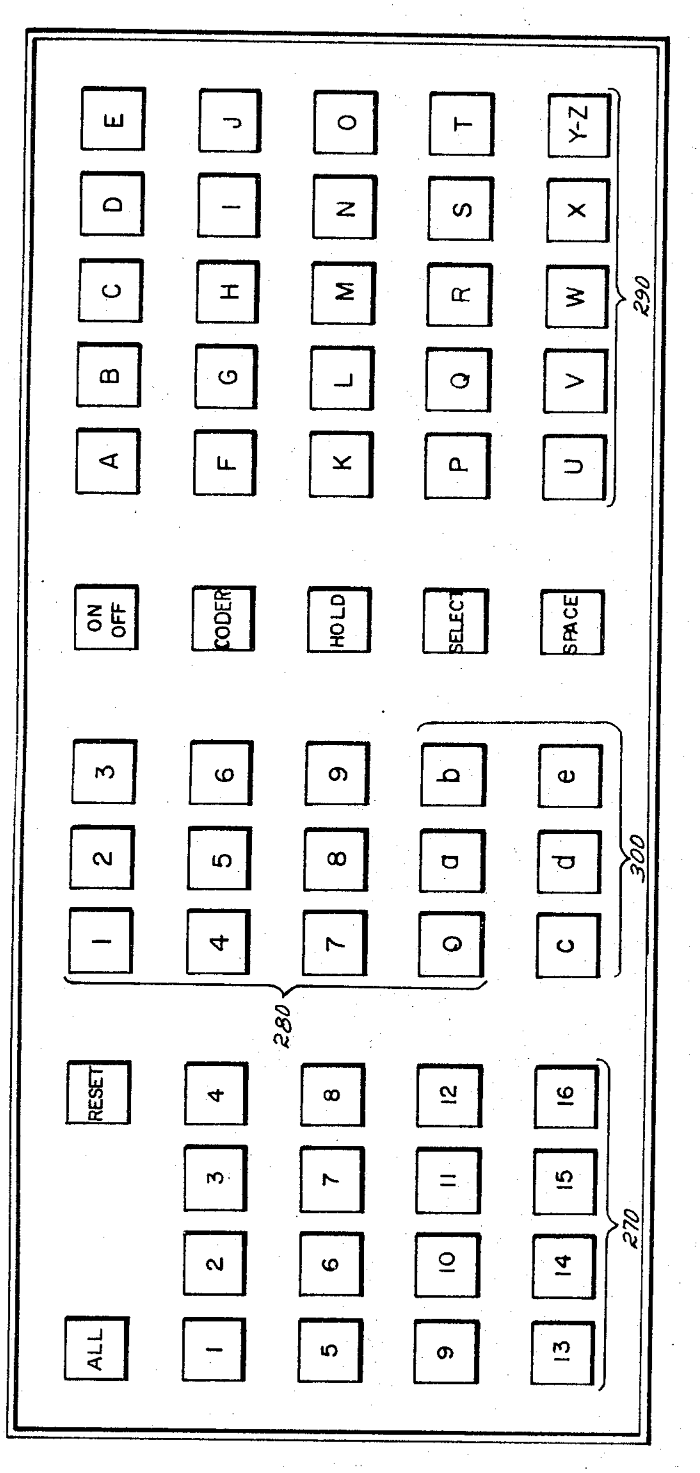
FIGURE 25 is a top plan view of the keyboard of one preferred form of console.

The operator controls the sorting operation utilizing console 11, the keyboard of which is shown in FIGURE 25. As was indicated previously, the details of the console and associated circuit are disclosed and claimed in the copending patent application of Robert J. Kalthoff, Frederic R. G. Sanborn and Daniel J. Bandenburg for "Console and Control Circuit," Ser. No. 539,792, filed Apr. 4, 1966.

Initially, the operator completes an energization circuit to the console by depressing the "on-off" button, or key, on the console. In the next step of a sorting operation, the operator manipulates one of the group of selector conditioning, or enabling, keys indicated generally at 270 in FIGURE 25. These keys determine which of the bank of selectors will be utilized in a particular search. Thus, the operator may elect to have all of the individual selectors of the bank shown in FIGURE 2 operated simultaneously. In this event, the "all" button is depressed and all of the selectors are energized and conditioned to receive the code signal inputs. If, alternatively, the operator desires to search only one selector, or a group of selectors, he initially depresses the button, or buttons, of group 270 corresponding to the selectors to be operated. For example, if he desires to operate only selector 1, the "1" button of group 270 is depressed. Depression of this button results in energization of only the first selector. It is to be understood that a suitable hold-in relay circuit is provided so that even momentary depression of one of the buttons of group 270 is effective to cause a selector to be energized and remain energized until it is deenergized.

Figure 19:
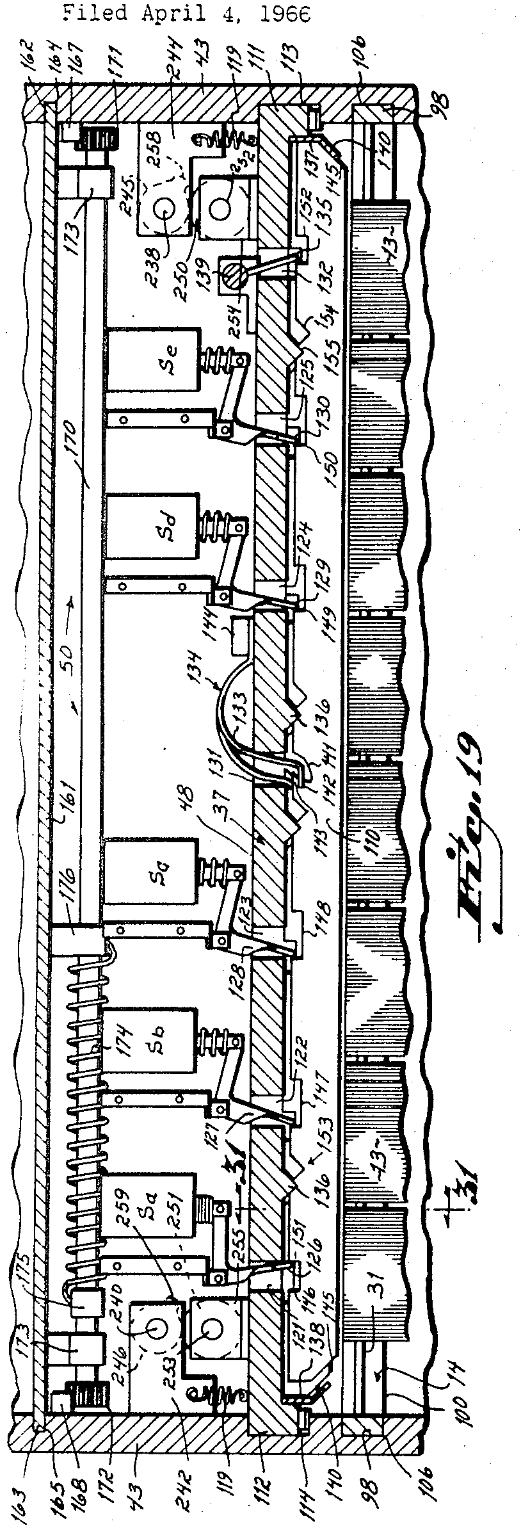
FIGURE 19 is a partial cross sectional view similar to FIGURE 14 showing operation of a solenoid for setting the selector bars.

Assume that the operator presses the "1" button to condition the "1" selector for operation. The next step is to insert the desired code into this selector. At the beginning of the code setting operation, carriage 161 of the selector is positioned in its "home" position over the first field as shown in FIGURE 13. With the carriage in this position, the fingers 126–130 associated with solenoids $S_a$–$S_e$ are respectively positioned for engagement with the tabs 151 of the *a, b, c, d* and *e* bit bars of the first field. As indicated in FIGURE 4, the first field is to be coded with the numerical code "2." To enter this code, the operator depresses the "2" button in the numerical group of buttons 280. If this code had been an alphabetic code, such as the code letter "D," the operator would have depressed one of the buttons in alphabetic code group 290. As is indicated in FIGURE 26, in the specific code described in this application, the numeral "2" corresponds to notches in the bit sites "*a*" and "*c*." Accordingly, when the "2" key is depressed, solenoids $S_a$ and $S_c$ are energized. Solenoid $S_a$ is effective to shift the "*a*" bar in the first field to the right as indicated in FIGURES 19 and 33, causing that bar to be shifted downwardly and to be locked in position by ribs 136 in the manner diagrammatically shown in FIGURE 33. Simultaneously, solenoid $S_c$ causes the "*c*" bit blade to be shifted to the right and projected downwardly.

When the first code signal is entered, e.g. when the "2" button is depressed in the present example, a circuit is completed to the tray lift motor MT. This motor drives shaft 93 and cam 92 so that tray 12 and cards 13 are shifted from their lowermost position shown in FIGURE 15 upwardly to their sorting position shown in FIGURE 16. Specifically, when cam 92 rotates, it forces shaft 82 and tray lift arms 80 to be pivoted in a clockwise direction urging tray receptacle 56 upwardly and rearwardly. As the tray receptacle reaches the upper portions of its travel, any cards elevated out of the stack are pushed downwardly by stacking bar 76 and forwardly by wall 52.

The cards are forced over pivot rail 31 so that the rail seats in pivot notches 22 of the cards. The forward edges of the card are aligned by guide bar 32 which seats in locator notch 20. The upper metal ferromagnetic implants 17 of the cards are firmly held by upper magnet 30. The cards are thus suspended between magnet 30 at the forward edge of the card and pivot rail 31 at the rear edge of the card. After the cards have been seated, shaft 93 and cam 92 continue to complete a single revolution so that the tray lift arms 80 are lowered out of engagement with the tray receptacle as shown in FIGURE 30. The tray is held in its elevated position, however, by arms 72 and spring 71.

Depression of the "2" key also causes a space signal to be generated to energize solenoid SV. This causes shaft 180 and ratchet bar 178 to be pivoted to the position shown in FIGURE 23. The upper pawl finger is thus shifted to the space between the first and second teeth as shown in FIGURE 22. When the momentary signal to SV is terminated, ratchet arm 178 is again pivoted upwardly so that it is disengaged from the lower pawl finger 190. Carriage 161 is thus free to advance one field under the force of torsion spring 174 which rotates shaft 170 and pinions 172 and 173 in engagement with racks 167 and 168. The carriage is then shifted to a position over the second field. The fingers 126–130 associated with solenoids $S_a$–$S_e$ are thus positioned over the "*a*"–"*e*" bits respectively.

Again referring to FIGURE 4, it will be noted that the code in the second field is a "3" code. The operator enters this code by depressing the "3" button of the keys in group 280. The "3" code (FIGURE 26) corresponds to notches in the bit sites "*b*" and "*c*". Accordingly, when the "3" button is depressed, solenoids $S_b$ and $S_c$ are thus energized. These cause the "*b*" and "*c*" bars in the second field to be projected or set in the manner explained above. Again, a space signal is generated as a result of the depression of the "3" key and the carriage 161 is advanced in the manner explained above to a position over the third field.

In the third field, the numeral 5 is to be coded. This numeral is coded by depressing the "5" button in group 280 which, in accordance with the code setup shown in FIGURE 26, causes the blades to be set over the "*b*" and "*d*" bit sites in the third field. This is accomplished by energizing solenoids $S_b$ and $S_d$ which set the "*b*" and "*d*" bars in the third field in the manner described. Again, a space signal is generated as a result of the actuation of the "5" button so that the carriage is shifted to a position over the fourth field.

The fourth field is to be coded with the numeral 7. Accordingly, when the "7" button is depressed, solenoids $S_a$ and $S_e$ are energized causing the "*a*" and "*e*" bit bars in the fourth field to be set in the manner described above. The space signal, which is generated as a result of the depression of the "7" button, causes the carriage to be advanced to a position over the fifth field.

The fifth field is to be coded with the numeral 9. Accordingly, the "9" button is depressed, causing solenoids $S_c$ and $S_e$ to be energized to set the "*c*" and "*e*" bit bars in the fifth field. When the "9" button is depressed, a space signal is generated so that the carriage 161 is advanced to a position over the sixth field.

Again referring to FIGURE 4, it will be noted that in the sixth field the card is to be coded not with an alphanumeric signal, but rather with a bit signal, i.e. the bit "*b*." This bit signal is entered by operating the bit "*b*" key of group 300. When this key is depressed, a circuit is completed to the $S_b$ solenoid. Finger 127 of this solenoid engages the tab 151 of the "*b*" bit bar in the sixth field and urges that bar to the right (FIGURE 33) and downwardly in the manner explained above. When the bit "*b*" key is energized, no space signal is produced. Accordingly, the operator must now cause the carriage to be shifted to the seventh field. This is done by depressing the "Space" key on the keyboard. When the "Space" key is depressed, a signal is applied to solenoid SV. This causes shaft 180 and ratchet bar 178 to be pivoted causing the pawl mechanism to permit the carriage 161 to be advanced one field into a position over the seventh field in the manner explained previously.

The seventh field is also to be coded with a bit code, i.e. the bit "*e*." The bit "*e*" code button from group 300 is depressed, energizing solenoid $S_e$. This sets the "*e*" bar in the seventh field, but does not generate a space signal. The carriage is spaced to a position over the eighth field by depressing the "Space" button. However, as is shown in FIGURE 4, no code is to be entered in the eighth field. Thus, the "Space" button is again depressed to energize the SV solenoid and cause the carriage 161 to be advanced another incremental distance to a position over the ninth field.

In the ninth field, the bit "*b*" is entered by depressing the bit "*b*" key in the keys of group 300. This energizes the solenoid $S_b$ and causes the "*b*" bar in the ninth field to be set. At this point, all of the bars corresponding to the coded notches in the first nine fields of the card shown in FIGURE 4 are set, i.e. are projected downwardly from the remaining bars in the manner illustrated in FIGURE 31. All of the bars are still spaced above the cards, however.

The code has now been fully entered and the operator is ready to complete the sorting operation. This is accomplished by depressing the "select" button on the console. When the "select" button is depressed, a circuit is completed to the platen motor MP. This motor drives chain 227. As shown in FIGURE 21, this chain in turn rotates sprockets 236 and 237 causing rotation of shafts 238 and 240. These shafts carry eccentric cams 245 and 246 which engage follower rollers 250 and 251 mounted on the upper edge of the platen 48. The platen is thus forced downwardly carrying with it all of the selector bars. The selector bars which have been set are thus forced against the upper, or sorting, edges of the cards in the manner shown diagrammatically in FIGURE 10.

The "set," or projecting, selector bars enter the notches of any cards bearing the same code as that shown in the first nine fields of the card of FIGURE 4. These "selected" cards are not moved. All other cards are engaged by one or more selector bars and are forced downwardly. As a result, these "rejected" cards are separated from the field of magnet 30. Subsequently, the lower implants 25 of the rejected cards are firmly gripped by lower magnet 28. The weight of the rejected cards causes tray 12 and the tray lift mechanism to be pivoted downwardly at a rate controlled by the damper in the manner shown diagrammatically in FIGURE 11. In this manner, the rejected cards are separated from the selected cards which remain in contact with the main magnet 30 and pivot rail 31.

After the tray has returned to its lower, or original, position, the relationship of the rejected and selected cards is similar to that shown in FIGURE 1. The selected card, or cards, can then be completely removed by grasping the cards. Alternatively, slide frame 14 can be pulled outwardly in the manner shown in FIGURE 6. The selected card, or cards, can then be inspected or pulled from the magnet and pivot rail. The magnet and pivot rail are then pushed inwardly in preparation for the next sort.

As part of the selection cycle, the carriage 161 is returned to its "home" position over the first field. This return movement is effected by movement of arm 203. As is shown in FIGURE 13, this arm is connected by link 216 to a circular plate 218 which is driven by the platen motor through chain 227, sprocket 263, shaft 262, gears 261 and 260, and shaft 220. As the plate 218 is rotated, arm 203 sweeps forwardly and engages roller 202 on the ratchet assembly. This causes plate 201 to be pivoted in a counterclockwise direction shown in FIGURE 4.

Both pawl fingers 190 and 191 are retracted and are locked by hook member 205. The pawl assembly and carriage are forced forwardly by arm 203 until the arm reaches the forward limit of its movement and starts to shift rearwardly. At this time, the hook 205 is released by engagement with abutment 212 to release the pawl fingers and cause them to engage the first tooth of the ratchet bar as shown in FIGURE 13. This holds the carriage over the first field. Continued rotation of plate 218 causes arm 203 to be returned to its rearmost position. When the arm is returned, switch SW4 is opened by the engagement of its follower 222 with recess 221 of plate 218. Also, pin 235 on arm 203 actuates switch SW3. This results in actuation of the reset solenoid SR. When SR is energized, shaft 139 is pivoted in a clockwise direction in FIGURE 19 to reset all bars by shifting them to the left in the manner shown diagrammatically in FIGURE 34. The selector is now ready for the next sorting operation.

From the foregoing disclosure of the general principles of the present invention and the above detailed description of one preferred embodiment, those skilled in the art will readily comprehend various modifications to which the invention is susceptible. Accordingly, we desire to be limited only by the scope of the following claims. In these claims, it is to be understood that the term "record card" is used as a generic term to include other rectangular documents, such as microfiches, film jackets, aperture cards and the like.

From the above disclosure of the general principles of the present invention and the above description of the preferred embodiment, those skilled in the art will readily comprehend various modifications to which the invention is susceptible. For example, it is contemplated that the upper ferromagnetic implant 17 can be shifted along the sorting edge 16 from its position adjacent to the edge 18. Also the bottom ferromagnetic implant 25 can be shifted along the lower edge 26 relative to the position of the upper ferromagnetic implant 17 if desired.

Having described our invention, we claim:

1. A record card for use in mechanical data retrieval systems, said card being of generally rectangular configuration and including a sorting edge defining a plurality of notch sites, said notch sites being adapted to be notched in accordance with a predetermined code, the unnotched notch sites forming pillars adapted to be engaged by sorting bars exerting a force on said card perpendicular to said sorting edge, a first ferromagnetic implant carried by said card along the sorting edge thereof, said first ferromagnetic implant extending along only a small portion of the sorting edge spaced from said notch sites, a second ferromagnetic implant carried by said card on the edge of said card opposite to said sorting edge, said first and second ferromagnetic implants being disposed in a plane substantially perpendicular to said sorting edge, said implants being effective to cooperate with opposing magnets to provide a differential magnetic force on said card perpendicular to said sorting edge in a plane parallel to the force exerted on said pillars.

2. The record card of claim 1 in which said first ferromagnetic implant is disposed closely adjacent to a corner of said card formed by said sorting edge and a transverse edge.

3. The record card of claim 2 in which said card further comprises a pivot notch formed in a transverse edge of said card opposite from the transverse edge adjacent to said ferromagnetic implant, said pivot notch being disposed closely adjacent to said sorting edge.

4. The record card of claim 3 in which said second ferromagnetic implant is disposed on the opposite edge of the card from the sorting edge and is disposed adjacent to a corner of said card.

5. The record card of claim 4 in which said record card is further provided with a second pivot notch formed in the transverse edge containing said first pivot notch, said second pivot notch being disposed closely adjacent to the opposite edge of said card carrying said second ferromagnetic implant.

6. A record card for use in mechanical data retrieval systems, said card being of generally rectangular configuration and including a sorting edge defining a plurality of notch sites, said notch sites being adapted to be notched in accordance with a predetermined code, a first ferromagnetic implant carried by said card along the sorting edge thereof, said first ferromagnetic implant being disposed closely adjacent to a corner of said card formed by said sorting edge and the transverse edge, said sorting edge further having a locating notch extending inwardly therefrom, a second ferromagnetic implant carried by said card on the edge opposite to said sorting edge, said card further comprising a second transverse edge spaced from said ferromagnetic implant, a pivot notch formed in said second transverse edge closely adjacent to said sorting edge, and a second ferromagnetic implant carried by said card on the edge of said card opposite from said sorting edge.

7. The method of sorting edge notched cards of the type having a notched edge and a ferromagnetic element disposed along said notched edge to separate cards having a notch pattern corresponding to the predetermined code from cards having different notch paterns, said method comprising the steps of bringing said cards into alignment with the notched edges of said cards being uppermost, supporting all of said cards by applying a suspending magnetic force to said cards, selectively rejecting only those cards not having said predetermined notch pattern by mechanically pushing said cards downwardly against said suspending magnetic force whereby the effect of said suspending magnetic force is weakened and said force is no longer effective to hold the selectively rejected cards in suspension and said rejected cards are lowered from their suspended position while the selected cards remain suspended on the magnet.

8. The method of claim 7 in which said selected cards are further separated from the rejected cards by subsequently shifting said suspending magnetic force while retaining said selected cards in suspension to withdraw said selected cards to a position in which they are further separated from said rejected cards.

9. The method of claim 7 in which said magnetic force is shifted in a horizontal plane.

10. The method of claim 7 in which said cards are further subjected to a second downwardly directed magnetic force, said second downwardly directed magnetic force being ineffective to separate cards from said suspending magnetic force until said cards are mechanically pushed therefrom, said second downwardly directed magnetic force thereafter being effective to prevent upward return of said rejected cards under the influence of said suspending magnetic force.

11. The method of claim 10 in which said cards are originally brought into alignment to form a stack and said rejected cards are received within a tray during their entire downward movement from their suspended position whereby the cards are retained in a stacked position.

12 The method of claim 7 in which said cards are originally brought into alignment to form a stack and said selectively rejected cards are disposed within a tray during their entire downward movement from their suspended position whereby the cards are retained in a stacked relationship.

13. The method of claim 12 in which said tray is pivoted downwardly at a controlled rate.

14. The method of sorting edge notched cards to separate cards having notch patterns corresponding to a predetermined code from cards having other notch patterns, said method comprising the steps of suspending all of said cards at two spaced points, said cards being mechanically suspended at one point by means of a stationary member in engagement with a pivot notch formed in said card, said card being suspended at the other point by means of an upwardly directed magnetic force, selectively rejecting only those cards not having a predetermined notch pattern by mechanically pushing said cards downwardly against said magnetic force, whereby the cards pivot downwardly and the effect of said suspended magnetic force is weakened sufficiently so that said force is no longer effective to hold the selectively rejected cards in suspension and said rejected cards are lowered from their suspended position.

15. The method of claim 14 in which said cards are subjected to a second downwardly directed magnetic force, said second downwardly directed magnetic force being ineffective to separate cards from said suspending magnetic force until said cards are mechanically pushed therefrom, said second downwardly directed magnetic force thereafter being effective to prevent upward return of said rejected cards under the influence of said suspending magnetic force.

16. The method of claim 14 in which the cards are originally brought into alignment to form a stack and said cards are disposed within a tray during their entire downward movement from their suspended position whereby the cards are retained in a stacked relationship.

17. The method of sorting edge notched cards coded with a plurality of descriptors to separate said cards from cards edge notched with at least some other descriptors, said method comprising the steps of bringing said cards into alignment with the notched edges of said cards being uppermost, suspending all of said cards by applying a suspending magnetic force to said cards, selectively rejecting only those cards that do not have edge notches corresponding to certain of said plurality descriptors by mechanically pushing said cards downwardly against said magnetic force, whereby the effect of said suspending magnetic force is weakened, said force is no longer effective to hold the selectively rejected cards in suspension and said rejected cards are lowered from their suspended position, retaining the selected cards in their suspended position, observing the number of selected cards, subsequently elevating said rejected cards back into an aligned position with said selected cards and repeating the step of selectively rejecting only those cards not having a predetermined notch pattern corresponding to a different plurality of descriptors to cause the selection of a greater or lesser number of cards than those originally selected.

18. In apparatus for mechanically separating edge notched cards bearing a predetermined notch pattern from a plurality of different cards, said cards carrying ferromagnetic implants, the combination of an elongated tray adapted to constrain a plurality of cards with their notched edges uppermost, means for shifting the tray toward the magnet, elongated suspension magnet extending lengthwise of said tray and being positioned to simultaneously engage and attract the ferromagnetic implants of all of the cards to hold the cards in suspension, a plurality of selector bars extending in parallel spaced relationship to said elongated magnet, means for selectively setting any of said selector bars, whereby said bars project downwardly below the remaining bars, and means for effecting relative movement between said bars and said cards toward one another to force rejected cards not having said predetermined notch configuration away from said suspension magnet, whereby said selectively rejected cards are shifted downwardly, said cards remaining constrained by said tray, the cards having the selected notch configuration remaining in contact with said suspension magnet.

19. The apparatus of claim 18 in which said tray shifting means are disengaged when said tray is in its uppermost position, and including spring urged means for holding said tray in its uppermost position, said spring urged means being overcome and said tray being lowered when said tray is subjected to the weight of a predetermined number of said cards substantially less than the total number of cards carried by said tray.

20. The apparatus of claim 19 in which damping means are provided for controlling the rate of downward movement of said tray.

21. The apparatus of claim 18 in which said tray shifting means is effective to elevate said tray in a compound motion in which said tray is pivoted upwardly and is simultaneously translated to seat the pivot notches of said cards upon said pivot rail.

22. The apparatus of claim 21 in which said tray shifting means are disengaged when said tray is in its uppermost position, including spring means for holding said tray in its uppermost position, said spring means being overcome and said tray being lowered when said tray is subjected to the weight of a predetermined number of cards substantially less than the total number of cards carried by said tray.

23. The apparatus of claim 21 further including a stationary restack bar disposed to engage the cards in said tray and stacking said cards as said tray approaches the upper limit of its travel.

24. The apparatus of claim 23 further including an angulated rear wall on said tray effective to cooperate with said reset bar to cause cards to be cammed downwardly and forwardly as said tray approaches the upper limit of its travel.

25. In apparatus for mechanically separating edge notched cards bearing a predetermined notch pattern along a sorting edge from a plurality of different cards, said cards carrying ferromagnetic implants on said sorting edge and a pivot notch on a transverse edge remote from said ferromagnetic implant, the combination of an elongated suspension magnet disposed to engage and attract the ferromagnetic implants on the cards, a pivot rail disposed to enter the pivot notches of said cards, said pivot rail and said suspension magnet being effective to support said cards by applying force thereto at spaced points, a plurality of selector bars extending in parallel spaced relationship to said elongated magnet, means for selectively setting any of said selector bars, whereby said bars project downwardly below the remaining bars, and means for advancing said bars against said cards to force cards not having said predetermined notch configuration away from said suspension magnet, whereby said selectively rejected cards are shifted downwardly pivoting about said pivot rail, the cards having the selected notch configuration remaining in contact with said suspension magnet and pivot rail.

26. The apparatus of claim 25 further including a slide frame interconnecting said pivot rail and said elongated magnet, and means slidably supporting said slide frame for outward movement in a horizontal plane relative to said selector bars.

27. The apparatus of claim 25 further including a tray for retaining cards in stacked relationship while said cards are in engagement with said suspension magnet and when said cards are shifted downwardly.

28. In apparatus for mechanically separating edge notched cards bearing a predetermined notch pattern from a plurality of different cards, each of said cards having a sorting edge along which said notch pattern is formed and carrying a ferromagnetic implant upon said sorting edge, each of said cards further carrying a second ferromagnetic implant on an edge opposite from said sorting edge, the combination of an elongated suspension magnet for attracting the ferromagnetic implants of the cards to hold the cards in suspension, a plurality of selector bars extending in parallel spaced relationship to said elongated magnet, means for selectively setting any of said selector bars, whereby said bars project downwardly below the remaining bars, and means for effecting relative movement between said bars and said cards toward one another to force cards not having said predetermined notch configuration away from said suspension magnet, a second magnet disposed to attract the second ferromagnetic implants of said cards, said second magnet exerting a force on said cards in a direction opposite to the force of the suspension magnet.

29. The apparatus of claim 28 further including a tray for supporting cards in stacked relationship while said cards are in engagement with said suspension magnet and when said cards are shifted downwardly, said second magnet being mounted for movement with said tray.

30. In apparatus for mechanically separating edge notched cards bearing a predetermined notch pattern from a plurality of different cards, each of said cards having a sorting edge along which said notch pattern is formed and carrying a ferromagnetic implant upon said sorting edge, each of said cards further carrying a second ferromagnetic implant on an edge opposite from said sorting edge and a pivot notch on a transverse edge remote from said ferromagnetic implant, the combination of an elongated suspension magnet for attracting the ferromagnetic implants of the cards to hold the cards in suspension, a pivot rail for engaging the pivot notches of said cards, a plurality of selector bars extending in parallel spaced relationship to said elongated magnet, means for selectively setting any of said selector bars, whereby said bars project downwardly below the remaining bars, and means for advancing said bars against said cards to force cards not having said predetermined notch configuration away from said suspension magnet, a second magnet disposed to attract the second ferromagnetic implants of said cards, said second magnet exerting a force on said cards in a direction opposite to the force of the suspension magnet.

31. In apparatus for mechanically separating edge notched cards bearing a predetermined notch pattern along a sorting edge from a plurality of different cards, said cards carrying ferromagnetic implants on said sorting edge and a pivot notch on a transverse edge remote from said ferromagnetic implant, the combination of an elongated suspension magnet for attracting the ferromagnetic implants of the cards to hold the cards in suspension, a pivot rail for engaging the pivot notches of said cards, a platen, a plurality of selector bars carried by said platen and extending in parallel spaced relationship to said elongated magnet, means for selectively setting any of said selector bars, whereby said bars project downwardly below the remaining bars, and means for advancing said platen toward said cards to force cards not having said predetermined notch configuration away from said suspension magnet, whereby said selectively rejected cards are shifted downwardly, the cards having the selected notch configuration remaining in contact with said suspension magnet.

32. In apparatus for mechanically separating edge notched cards bearing a predetermined notch pattern from a plurality of different cards, said cards carrying ferromagnetic implants, the combination of an elongated suspension magnet for attracting the ferromagnetic implants of the cards to hold the cards in suspension, a platen, a plurality of selector bars carried by said platen and extending in parallel spaced relationship to said elongated magnet, means for selectively setting any of said selector bars, whereby said bars project downwardly below the remaining bars, and means for advancing said platen toward said cards to force cards not having said predetermined notch configuration away from said suspension magnet, whereby said selectively rejected cards are shifted downwardly, the cards having the selected notch configuration remaining in contact with said suspension magnet.

33. The apparatus of claim 32 further including means actuated subsequent to the advance of said platen for returning any of the selector bars which has been projected downwardly back to its initial position in alignment with the remaining selector bars.

34. In apparatus for mechanically separating edge notched cards bearing a predetermined notch pattern from a plurality of different cards, said cards carrying ferromagnetic implants, the combination of an elongated suspension magnet for attracting ferromagnetic implants of the cards, a platen, a plurality of selector bars, spring means carried by said platen for mounting said plurality of selector bars movably with respect to said platen, first means for setting any of said selector bars to project said set selector bars an increased distance below said platen, second means for releasably retaining said bars in set position, and third means for returning said previously set bars to their original position, and means for advancing said platen toward said cards to force cards not having said predetermined notch configuration away from said suspension magnet.

35. The apparatus of claim 34 in which said spring means comprises a comb spring having tines secured to said selector bars.

36. The apparatus of claim 34 in which each of said selector bars is provided with at least one slot and a pair of V-shaped notches, one of said notches being larger than the other, said platen being provided with a V-shaped rib substantially the same size as the larger of said notches, a solenoid, a finger actuated by said solenoid in engagement with said slot for urging said selector bar in the direction of its longitudinal extent, whereby said selector bar is simultaneously cammed downwardly to a set position by its engagement with said rib, said rib seating in said shallower notch to retain said selector bar in its set position.

37. The apparatus of claim 36 in which said selector bar is provided with a reset notch and said third means comprise a blade disposed within said reset notch, and means for rotating said blade to force said selector bar in a direction opposite to the direction in which it is shifted by said finger, whereby said selector bar is returned to its original position.

38. In apparatus for mechanically separating edge notched cards bearing a predetermined notch pattern from a plurality of different cards, said cards carrying ferromagnetic implants, the combination of an elongated suspension magnet for attracting ferromagnetic implants of the cards, a platen, a plurality of selector bars, spring means carried by said platen for mounting said plurality of selector bars movably with respect to said platen, first means for setting any of a plurality of said selector bars to project said set selector bars an increased distance below said platen, second means for releasably retaining said bars in set position, third means for shifting said first means into cooperative relationship with a second plurality of selector bars whereby said first means is effective to set any of said second plurality of selector bars, and fourth means for returning said selector bars to their original position, and means for advancing said platen toward said cards to force cards not having said predetermined notch configuration away from said suspension magnet.

39. In apparatus for mechanically separating edge notched cards bearing a predetermined notch pattern in a plurality of different fields from a group of different cards, said cards carrying ferromagnetic implants, the combination of an elongated suspension magnet for attracting ferromagnetic implants of the cards, a platen, a plurality of selector bars carried by said platen, said selector bars being divided into a plurality of groups of bars, each group of bars corresponding to a coding field of said cards, first means for selectively setting any of the bars in one field, second means for incrementally advancing said first means from field to field, whereby said first means is sequentially effective to set the selector bars in each field.

40. The apparatus of claim 39 further comprising means for simultaneously returning all of the bars which have been set to their initial position.

41. The apparatus of claim 39 further comprising means for automatically returning said first means to a "home" position over a predetermined one of said fields.

42. The apparatus of claim 39 in which said first named means comprise a plurality of solenoids corresponding in number to the selector bars in the field, a finger actuated by each of said solenoids and disposed for engagement with one of the bars in said field respectively, said finger being effective when its associated solenoid is actuated to shift said bar to its set position.

43. The apparatus of claim 42 in which said second means is effective to shift said first named means, whereby said fingers engage corresponding bars of each field when said first named means is shifted into operative relationship with the bars of said field.

44. In apparatus for mechanically operating edge notched cards bearing a predetermined notch pattern in a plurality of different cards, said cards carrying ferromagnetic implants, the combination of an elongated suspension magnet for attracting ferromagnetic implants of the cards, a generally rectangular platen, said platen being configurated to form a plurality of longitudinal slots, a plurality of selector bars disposed within said slots, spring means supporting said selector bars, said selector bars being divided into a plurality of groups of bars, each group of bars corresponding to a coding field of said cards, a plurality of transverse slots in said platen extending at right angles to said selector bars, a carriage carried by said platen, means mounting said carriage for shiftable movement parallel to said transverse slots, a plurality of solenoids carried by said carriage, a finger associated with each of said solenoids and extending downwardly through one of said transverse slots in said platen, each of said selector bars being provided with a plurality of recesses corresponding in number and location to the transverse slots of said platen, one of the recesses in each of said bars being narrower than the remaining recesses to define a tab portion, each of said solenoid actuated fingers being disposed for engagement with the tab portion of one of said selector bars, and being effective when said solenoid is actuated to shift said selector bar to a set position, and means for advancing said platen toward said cards.

45. The apparatus of claim 44 further comprising means for incrementally advancing said carriage from one field to another, whereby the fingers engage corresponding selector bars of each of said groups of bars corresponding to each of said fields.

46. The apparatus of claim 45 further comprising means for returning said carriage to a position over a predetermined one of said groups of bars in response to operation of said means for advancing said platen toward said cards.

47. The apparatus of claim 44 further comprising means for resetting said bars, said last named means comprising an additional slot formed in each of said selector bars, a reset blade pivotally carried by said platen and in engagement with said last named slots, and means for selectively rotating said blade to shift said bars in a direction opposite to that in which they are shifted by said fingers.

48. A method of sorting edge notched magnetically responsive data cards having a predetermined notch configuration from a group of cards having various configurations, said method comprising the steps of supporting said collection of edge notched data cards in a stack, subjecting said stack of cards to first and second opposing magnetic fields, initially holding all of said cards by the first of said magnetic fields, engaging said cards with a plurality of elements positioned in correspondence with the predetermined notch configuration, and causing said plurality of elements to force cards not having said predetermined notch configuration toward said second magnetic field, whereby those cards not having the predetermined notch configuration are shifted to a position wherein they are held by the second magnetic field, the cards having the predetermined notch configuration remaining in a position in which they are held by the first magnetic field.

49. The method of claim 48 in which the cards in said stack are disposed vertically with the first and second magnetic fields disposed above and below said cards respectively.

50. The method of claim 48 in which the first and second magnetic fields are of differential strength.

51. The method of claim 50 in which the first and second magnetic fields are of differential strength.

52. Apparatus for sorting edge notched magnetically responsive cards having a preselected notch configuration from a group of cards having various configurations, said apparatus comprising first and second spaced opposing magnets, means supporting said group of cards in a stack and bringing said stack into contact with said first magnet in a position in which said stack is interposed between said first and second magnets, means for engaging said cards with members configurated in said preselected notch configuration, means for effecting relative movement of said members and said cards toward one another for forcing cards not having said predetermined notch configuration from contact with said first mganet, said second magnet being effective to atract the cards forced from contact with the first magnet.

53. Apparatus of claim 52 in which said first and second magnets are disposed in substantially the vertical plane and in which said first magnet is effective to initially suspend said cards.

54. Apparatus of claim 52 in which said magnets are of differential strength.

55. Apparatus of claim 54 in which said magnets are of differential strength.

References Cited

UNITED STATES PATENTS

| | | | |
|---|---|---|---|
| 3,073,313 | 1/1963 | Mittag | 129—16.1 |
| 3,199,674 | 8/1965 | Kalthoff | 209—110 |
| 3,273,567 | 9/1966 | Smitzer | 129—16.1 |

M. HENSON WOOD, Jr., *Primary Examiner.*

RICHARD A. SCHACHER, *Assistant Examiner.*

U.S. Cl. X.R.

129—16.1; 235—61.11